United States Patent
Croft et al.

(10) Patent No.: US 8,469,512 B2
(45) Date of Patent: Jun. 25, 2013

(54) COMPUTER EYEWEAR WITH SPECTRAL FILTERING

(75) Inventors: Joseph Croft, San Clemente, CA (US); Andreea Trufasu, Encinitas, CA (US)

(73) Assignee: Gunnar Optiks, LLC, Carlsbad, CA (US)

( * ) Notice: Subject to any disclaimer, the term of this patent is extended or adjusted under 35 U.S.C. 154(b) by 42 days.

(21) Appl. No.: 13/149,745

(22) Filed: May 31, 2011

(65) Prior Publication Data
US 2012/0307194 A1 Dec. 6, 2012

(51) Int. Cl.
 *G02C 7/10* (2006.01)
 *G02C 7/06* (2006.01)
(52) U.S. Cl.
 USPC .............. 351/159.65; 351/159.49; 351/159.6
(58) Field of Classification Search
 USPC .............. 351/159.49, 159.6, 159.63, 159.64, 351/159.65
 See application file for complete search history.

(56) References Cited

U.S. PATENT DOCUMENTS

| | | | |
|---|---|---|---|
| 3,963,330 A | 6/1976 | Boniuk | |
| 4,470,673 A | 9/1984 | Gilson et al. | |
| 4,542,964 A | 9/1985 | Gilson et al. | |
| 5,604,547 A | 2/1997 | Davis et al. | |
| 5,646,781 A | 7/1997 | Johnson, Jr. | |
| 5,848,700 A | 12/1998 | Horn | |
| 5,928,718 A | 7/1999 | Dillon | |
| 6,010,218 A | 1/2000 | Houston et al. | |
| 6,145,984 A | 11/2000 | Farwig | |
| 6,250,759 B1 | 6/2001 | Kerns, Jr. et al. | |
| 6,361,166 B1 | 3/2002 | Perrott et al. | |
| 6,386,701 B1 | 5/2002 | Khulusi | |
| 7,976,157 B2 * | 7/2011 | Croft et al. | 351/159.49 |
| 8,342,681 B2 | 1/2013 | Croft et al. | |
| 2002/0116750 A1 | 8/2002 | Korb | |
| 2004/0156010 A1 | 8/2004 | Einhorn | |
| 2005/0024327 A1 | 2/2005 | Hagiwara et al. | |
| 2005/0099589 A1 | 5/2005 | Ishak | |

(Continued)

FOREIGN PATENT DOCUMENTS

| | | |
|---|---|---|
| CN | 2262712 Y | 9/1997 |
| CN | 1179838 A | 4/1998 |

(Continued)

OTHER PUBLICATIONS

"Computer Eyeglasses for People with Normal Vision." Internet Archive: Digital Library of Free Books, Movies, Music & Wayback Machine. Oct. 11, 2004 (eyefatigue.com). Web. Mar. 30, 2011. <http://www.archive.org/>.

(Continued)

*Primary Examiner* — Scott J Sugarman
(74) *Attorney, Agent, or Firm* — Knobbe, Martens, Olson & Bear, LLP

(57) ABSTRACT

Various embodiments of computer eyewear include optical treatments to provide a relaxing, calming, and soothing light environment for the eye. Certain embodiments of computer eyewear include a frame and two lenses. Each lens in these embodiments has optical power in the range from about +0.1 to about +0.5 diopters, and provides spectral filtering characterized by a transmission curve. The transmission curve includes a stop band portion positioned between about 320 nm to about 400 nm, a first plateau region positioned between about 420 nm to about 450 nm, a ramp region positioned between about 470 nm to about 560 nm, and a second plateau region positioned between about 570 nm to about 680 nm.

29 Claims, 15 Drawing Sheets

U.S. PATENT DOCUMENTS

| | | |
|---|---|---|
| 2005/0179859 A1 | 8/2005 | Perrott et al. |
| 2006/0055878 A1 | 3/2006 | Yee |
| 2006/0146275 A1 | 7/2006 | Mertz |
| 2010/0066974 A1* | 3/2010 | Croft et al. .................. 351/163 |

FOREIGN PATENT DOCUMENTS

| | | |
|---|---|---|
| CN | 1471651 A | 1/2004 |
| EP | 0756 183 A2 | 1/1997 |
| EP | 1 241 511 A2 | 9/2002 |
| WO | WO 02/37169 | 5/2002 |
| WO | WO 2007/146933 | 12/2007 |

OTHER PUBLICATIONS

"Fluorescent Lamp Spectra," From Wikipedia, http://en.wikipedia.org/wiki/Flourescent_light, accessed on Dec. 8, 2009, in 1 page.

"Uvex Lens Technology," 23 pages, accessed at http://web.archive.org/web/20060318053334/http://www.uvex.com/pdf/other/UvexLensTechnology.pdf on Mar. 8, 2010.

Anderson, et al., "Ultraviolet windows in commercial sunglasses ", Applied Optics (APPL. OPT.) (United States) 1977 16/2 (515-517), 1977.

Kudo, et al., "Evaluation of contrast sensitivity and prevention of eyestrain with the use of yellow-tinted soft contact lenses", Dept. Of Ophthalmol., Juntendo Univ. School of Med., 2-1-1 Hongo, Bunkyo-ku, Tokyo 113-0033, Japan, Folia Ophthalmol. Jpn.) (Japan) Jul. 1, 2006 , 57/7 (559-564).

Uvex Lens Selection Chart, http://www.uvex.com/products/lenschart.asp, Pp. 1-4, accessed on Nov. 7, 2006.

Uvex webpage, http://web.archive.org/web/20061112051737/http://www.uvex.com/products/lenschart.asp, pp. 1-3, accessed on Mar. 8, 2010.

Ward "Computing through lime-colored glasses. (Brachkt computer glasses) (product announcement)", PC-Computing, v2, n10, p. 58, Oct 1989.

Complaint for Patent Infringement and Declaratory Judgment, Demand for Jury Trial, *MEI 3D, LLC v. Gunnar Optiks, LLC*, dated Jan. 15, 2013 (Exhibits G, H and I have been redacted by applicant).

Feigin, et al., "Prevention of visula fatigue in computer users by eyeglasses with spectral filters", Vestnik oftalmologii (Russia) Mar.-Apr. 1998, 114(2) p. 34-6, ISSN: 0042-465X-Print 0042-465X (Abstract).

* cited by examiner

COMPUTER EYEWEAR WITH SPECTRAL FILTERING

BACKGROUND OF THE INVENTION

1. Field of the Invention

The field of the invention relates to eyewear, and more particularly to eyewear for enhancing a user's experience when viewing a computer screen, or other near object, for extended periods of time.

2. Description of the Related Art

Computer Vision Syndrome (CVS) is a condition which can result from focusing the eyes on a computer display for protracted periods of time. Common symptoms of CVS are blurred vision, headaches, musculoskeletal pain and fatigue, eye strain, dry eyes, difficulty in focusing the eyes at various distances, double vision, and light sensitivity. Due in part to the prevalence of extended computer usage in many vocations, CVS is a problem that does now, or may in the future, afflict millions of individuals.

SUMMARY OF THE INVENTION

Various embodiments of eyewear for viewing a near object, such as a computer screen, for extended periods of time are described herein.

One innovative aspect of the subject matter disclosed herein is computer eyewear. The computer eyewear includes a first and second lens with each lens having optical power in the range from about +0.1 to about +0.5 diopters. Each lens provides spectral filtering characterized by a transmission curve. The transmission curve includes a stop band portion positioned between about 320 nm to about 400 nm. The stop band portion reduces transmitted light by at least about 95% on average. The transmission curve also includes a first plateau region positioned between about 420 nm to about 450 nm, which transmits at least about 30% of light on average. The transmission curve further includes a ramp region positioned between about 470 nm to about 560 nm. The ramp region has higher transmission than the plateau region and reduces transmitted light by about 25% to about 35% on average at about 470 nm to about 480 nm. The transmission curve also includes a second plateau region positioned between about 570 nm to about 680 nm. The second plateau region reduces transmitted light by less than or equal to about 3% on average at about 640 nm to about 660 nm. The computer eyewear also includes a frame portion disposed about the first and second lens to provide support. Each lens can include a yellow tint to contribute to the spectral filtering.

In certain embodiments, the stop band portion reduces the transmitted light by at least about 97%. The stop band portion can also transmit at least about 1% of light between about 320 nm to about 400 nm. In some embodiments, the first plateau region extends over a width of at least about 10 nm. For example, the first plateau region can extend between about 430 nm to about 440 nm. In some embodiments, the first plateau region can transmit about 32% to about 36% of light. In some embodiments, the first plateau region can transmit about 32.5% to about 35.5% of light.

In certain embodiments, the ramp region extends over a width of at least about 50 nm. For example, the ramp region can extend between about 480 nm and about 530 nm. The computer eyewear of some embodiments has a transmission curve wherein the ramp region reduces transmitted light by about 25.5% to about 34.5% at about 470 nm to about 480 nm. The computer eyewear of some embodiments has a transmission curve wherein the ramp region reduces transmitted light by about 26% to about 34% at about 470 nm to about 480 nm. As yet another example, the computer eyewear of some embodiments has a transmission curve wherein the ramp region reduces transmitted light by about 26.5% to about 33.5% at about 470 nm to about 480 nm.

Various embodiments of the computer eyewear have transmission curves with the second plateau region reducing transmitted light by less than or equal to about 2.5% of light at about 640 nm to about 660 nm. Some embodiments of the computer eyewear have transmission curves with the second plateau region reducing transmitted light by less than or equal to about 2% of light at about 640 nm to about 660 nm.

The computer eyewear of some embodiments includes a first and second lens having substantially the same optical power to provide off-the-shelf correction for a user having substantially normal uncorrected or spectacle vision when viewing a computer screen. Another innovative aspect is a kit including a package of three or more pairs of the computer eyewear described herein. In other embodiments, the first and second lens have an additional amount of optical power to provide prescriptive correction for a user when viewing a computer screen, each lens providing spectral filtering characterized by a transmission curve.

In computer eyewear of some embodiments, each lens has optical power less than about +0.5 diopters. In some embodiments, each lens has optical power less than about +0.25 diopters. As a further example, each lens can have optical power equal to about +0.2 diopters. The computer eyewear can have wrap or pantoscopic tilt.

Another innovative aspect is a computer eyewear including a first and second lens, each lens having optical power in the range from about +0.1 to about +0.5 diopters. Each lens provides spectral filtering characterized by a transmission curve. The transmission curve includes a stop band portion positioned between about 320 nm to about 400 nm, a first plateau region positioned between about 420 nm to about 450 nm, a ramp region positioned between about 470 nm to about 560 nm and having higher transmission than the plateau region, and a second plateau region positioned between about 570 nm to about 680 nm. The ratio of a percent transmission at about 470 nm to a percent transmission at about 440 nm can be about 1.8 to about 2.2. In some embodiments, the ratio of a percent transmission at about 470 nm to a percent transmission at about 440 nm is about 1.9 to about 2.1. The computer eyewear also can include a frame portion disposed about the first and second lens to provide support.

In some embodiments, the ratio of a percent transmission at about 650 nm to a percent transmission at about 470 nm can be about 1.3 to about 1.5. As another example, the ratio of the percent transmission at about 650 nm to the percent transmission at about 470 nm can be about 1.35 to about 1.45. In some embodiments, the ratio of a percent transmission at about 650 nm to a percent transmission at about 440 nm is about 2.7 to about 2.9.

The computer eyewear of certain embodiments can include a first and second lens. The lens can include a dye combination having about 20% Yellow CY03, about 7% Orange 8150, about 2% Orange type 合-, and about 71% Diffusant EBFF by weight, based upon the total weight of the dye combination.

BRIEF DESCRIPTION OF THE DRAWINGS

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein. Certain embodiments are schematically illustrated in the accompanying drawings, which are for illustrative purposes only.

DETAILED DESCRIPTION OF VARIOUS PREFERRED EMBODIMENTS

Figure 1:
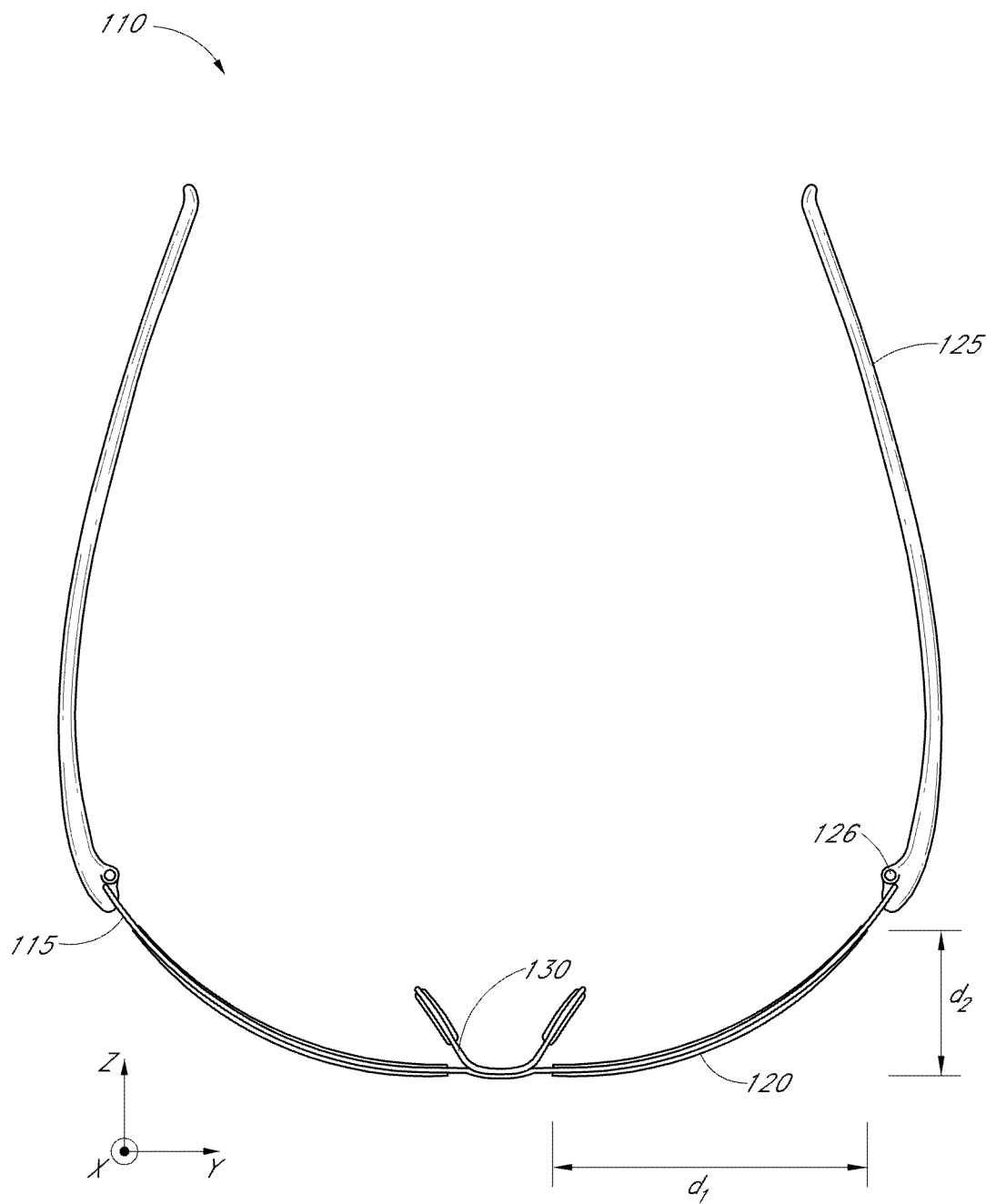
FIG. 1 is a top perspective view of eyewear that mitigates the symptoms of computer vision syndrome, according to one embodiment.

Example embodiments of eyewear for enhancing the experience of viewing a near object, such as a computer screen, for extended periods of time are described herein. The eyewear is non-prescription eyewear; it can be used without the requirement of an optometric examination and can be mass-manufactured without regard to the specific optical prescription of the end-user's eyes.

As described herein, computer Vision Syndrome (CVS) is a condition which can result from focusing the eyes on a computer display for protracted periods of time. Common symptoms of CVS are blurred vision, headaches, musculoskeletal pain and fatigue, eye strain, dry eyes, difficulty in focusing the eyes at various distances, double vision, and light sensitivity.

Relaxed eyes focus at a distance called the resting point of accommodation. For normal, healthy eyes, the resting point of accommodation is further away than the typical range of distances for viewing a computer monitor or other relatively near object upon which a person may fixate for substantial periods of time. Therefore, viewing a computer screen typically requires eye muscles to contract to bring an image of the screen, formed by the physiologic lenses, into focus at the retinas. This process of contracting eye muscles to increase the optical power of the corneal lenses is called accommodation. With extended, repetitive use, eye muscles used for accommodation tire. When the accommodation system begins to fail, an adaptation used to help clear optical blur is the pin-hole effect created by squinting. The increased use of facial muscles for the purpose of squinting and repetitive use of the intra-ocular muscles of the accommodative system can create some of the discomfort associated with many symptoms of CVS. In some cases, repetitive viewing of near objects, such as a computer screen, can even lead to long-term vision degeneration.

Vergence demand can also lead to symptoms of CVS. Vergence is the simultaneous movement of the eyes in opposite directions to maintain binocular vision. Just as normal eyes have a resting point of accommodation, they also have a resting point of vergence. Typically, the resting point of vergence causes the respective lines of sight of the left and right eyes to converge at a point that is further away than the typical viewing distance of a computer monitor. When viewing a near object, such as a computer monitor, eye muscles must rotate the eyes inwardly (toward the nose) so that both eyes converge upon the same point. As is the case for use of eye muscles for accommodation, extended contraction of eye muscles to converge on a near point can cause discomfort as well as vision problems. In addition, the systems of vergence and accommodation are linked in the brain stem. When the eyes accommodate, they converge. Some imbalances between these systems can cause symptoms of CVS with extended near work.

While many symptoms of CVS are caused by strain in the eye and face muscles to meet accommodation and vergence demands while viewing relatively near objects, there are also other factors which contribute to CVS. For example, studies have shown that people tend to blink less often than normal while viewing a computer screen or concentrating on near objects. Staring and decreased frequency of blinking can cause the eyes to dry out, leading to discomfort. Making matters still worse is the fact that many work environments include relatively dry air currents from HVAC equipment that increase tear evaporation and dryness in the eyes.

Some embodiments of the eyewear described herein mitigate symptoms generally associated with CVS. For example, some embodiments of the eyewear include lenses with a relatively small amount of optical power for lessening accommodation demands upon a user's eyes while viewing a computer screen through the eyewear at a typical working distance. The eyewear can also include an amount of prismatic power for lessening convergence demands upon a user's eyes while viewing a computer screen through the eyewear at a typical working distance. Some embodiments of the eyewear also include optical coatings, and other types of optical treatments, for performing spectral and spatial filtering upon light passing through the lenses in order to achieve desirable effects described herein, such as altering the spectrum of light that is incident upon the user's retinas.

In some embodiments, at least a portion of the eyewear has a wrap-around design. For example, the frame and/or the lenses may have a wrap-around design. The wrap-around design shields the eyes from air currents that could otherwise deprive the eyes of their natural moisture, helping to prevent uncomfortable dryness of the eyes. The eyewear may also include additional features for lessening air currents in the vicinity of the user's eyes, such as side-shields removably attached to the eyewear. In some embodiments, the wrap-around design, removable side-shields, and other features also aid in blocking extraneous light from reaching a user's eyes. Such extraneous light can increase glare, making it more difficult for a user to comfortably view an object such as a computer monitor.

Figure 2:
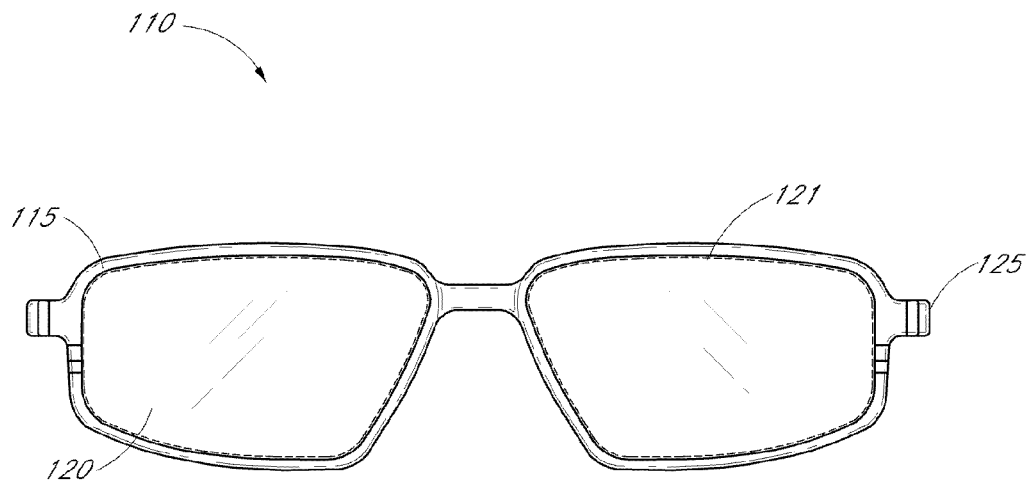
FIG. 2 is a front perspective view of the eyewear of FIG. 1.

FIG. 1 is a top perspective view of computer eyewear 110 that mitigates the symptoms of computer vision syndrome, according to one embodiment. The computer eyewear 110 includes a frame 115, left and right lenses 120, left and right ear stems 125, and a nose piece 130. FIG. 2 is a front perspective view of the computer eyewear 110 of FIG. 1, while FIG. 3 is a side perspective view of the computer eyewear 110 of FIG. 1.

Figure 3:
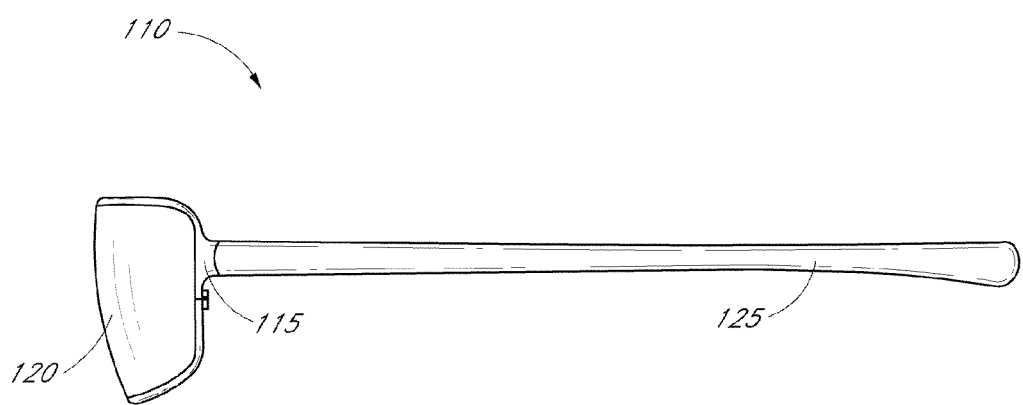
FIG. 3 is a side perspective view of the eyewear of FIG. 1.

As illustrated in FIGS. 1-3, the frame 115 is configured to support the lenses 120 in front of a user's eyes. The frame 115 is illustrated as a unitary piece with enclosures for the lenses 120 connected by a bridge portion 16. The bridge portion 16 is located at a medial region of the computer eyewear 110 and helps support the computer eyewear 110 on a user's nose. The frame 115 is coupled to left and right ear stems 125 at left and right lateral regions of the computer eyewear 110.

FIGS. 1-3 illustrate only a single embodiment of the frame 115 and one skilled in the art will recognize that computer eyewear frames can take many different shapes, sizes, and styles to suit the needs and aesthetic tastes of a wide variety of individuals. For example, the frame 115 may not be a unitary part but may instead comprise several pieces which are coupled together to form the frame 115. In some embodiments, the frame 115 does not entirely enclose the lenses 120 but instead supports them by one or more edges of the lenses 120. For example, the frame 115 may support the lenses 120 by their top edge 121 such that the lenses 120 suspend from the frame 115 downward in front of a user's eyes. Moreover, in some embodiments, the frame 115 need not support the lenses 120 by their edges but may instead be coupled to a surface of the lenses 120 by a fastener or adhesive.

As shown in FIGS. 1-3, the computer eyewear 110 also includes left and right ear stems 125 for supporting the eyewear 110 on a user's ears. The ear stems 125 are coupled to the frame 115 by hinges 126. The computer eyewear 110 also includes a nose piece 130 for supporting the eyewear 110 on a user's nose. It should be understood that any type of ear stem, hinge, nosepiece, or the like can be used with various embodiments of the computer eyewear 110. In addition, not all embodiments include each of the features illustrated in FIGS. 1-3, and some embodiments include additional features. For example, in some embodiments the computer eyewear 110 includes one or more straps to secure the eyewear to a user's head or clips to attach the computer eyewear 110 to a user's prescriptions eyeglasses.

In some embodiments, the frame 115 and/or ear stems 125 are made of metal, though other materials, such as plastics can also be used. Generally speaking, the frame 115 and ear stem 125 material can be chosen based on its strength, durability, density, and appearance. In some embodiments, relatively strong, low-density metals are advantageously chosen for the frame 115 and/or ear stem 125 material. For example, strong, light-weight metals such as aluminum, magnesium, titanium, alloys of the same, and the like can be used. These materials allow for the design of sturdy, light-weight eyewear 110. Other materials may also be used.

Since the overall weight of the computer eyewear 110 is significantly affected by the weight of the frame 115 and ear stems 125, the usage of low-weight materials results in computer eyewear 110 that is more comfortable for a user over long periods of time than if a denser material had been chosen. For example, it may be typical for a user to wear the computer eyewear 110 for periods of up to ten hours per day or longer viewing a computer screen. In some embodiments, the user's level of comfort while using the computer eyewear 110 is enhanced because the overall weight of the computer eyewear 110 does not exceed approximately 40 grams. For example, in some embodiments the overall weight of the computer eyewear 110 is less than approximately 30 grams. In some embodiments, the overall weight of the computer eyewear 110 is less than approximately 20 grams. In some embodiments, the overall weight of the computer eyewear 110 is less than approximately 15 grams. Values outside these ranges are also possible.

As illustrated in FIGS. 1-3, the computer eyewear 110 has a dual-lens design with left and right lenses 120. In other embodiments, the computer eyewear 110 may have a unitary lens structure with separate regions of optical power positioned in front of the user's eyes. The lenses 120 have an ocular curve, which comprises the eye-side surface of the lenses 120, and a base curve, which comprises the opposing, or outer, surface of the lenses 120. As described herein, the lenses 120 can include a mirror coating, tinting, an anti-reflective (AR) coating, combinations of the same, or the like on one or more of the base and ocular lens surfaces.

The lenses 120 are positive-power, or converging, lenses that reduce the accommodation demand upon a user's eyes while viewing a computer screen or other relatively near object upon which the user fixates for significant periods of time. The accommodative demand is lessened because the positive optical power of the lenses 120 sets the user's resting point of accommodation at a distance that is closer to the distance of the computer screen, or other object, that the user is viewing while wearing the eyewear 110. Since the positive optical power of the lenses 120 reduces accommodative demand, the user's eye muscles are permitted to relax, which in turn mitigates various symptoms of CVS.

In addition, the positive optical power of the lenses 120 may provide some magnification of objects nearer to the user than approximately the focal length of the lenses 120 by forming an enlarged virtual image of the object. Thus, in the case of a computer screen viewed at a distance less than the focal length of the lenses 120, text and images appearing on the computer screen are somewhat enlarged, allowing the user to read font sizes or see other details that would have been more difficult to perceive in the absence of the lenses 120.

The optical power required to eliminate accommodative demand for a given user viewing a computer monitor at a fixed distance can be calculated. However, experimental testing has revealed that it is also beneficial to consider subjective factors in selecting an optimal level of optical power for the computer eyewear. For example, if the lenses 120 are too strong they may cause the user to feel disoriented when looking at objects more distant than the computer screen. This feeling of disorientation can reduce the perceived benefit of using computer eyewear which, in theory, has the correct amount of optical power to eliminate accommodative demand upon the eyes while viewing a computer screen at a specified distance. In addition, the lenses 120 should not be so weak as to inadequately reduce the accommodative demand upon a user's eyes such that the user does not perceive a benefit to the computer eyewear.

Experimental testing has been conducted in an effort to determine a favorable level of optical power for a broad range of users, the results of which are included herein as Appendix A. As the eyewear is non-prescription, non-custom, stock eyewear, the optical parameters in various embodiments are configured to satisfy most wearers at typical computer display viewing distances. Accordingly, a group of computer users was studied to determine the optical parameters that worked well for most of the group. The experimental testing involved 58 subjects using computer eyewear of different optical powers in actual office environments. The eye-to-computer display viewing distance for most users was 20-30 inches, though this distance depends upon factors such as workspace set up and whether the wearer uses a desktop computer or a laptop computer (which tend to be viewed at shorter distances). For example, the working distance for some users fell in other less common ranges such as 35-40 inches, 30-35 inches, or less than 20 inches. Accordingly, in some embodiments, the computer eyewear is designed for viewing distances of 30 inches or less, while in other embodiments, the computer eyewear is designed for viewing distances of 35 inches or less or for 40 inches or less. In some embodiments, the computer eyewear is designed for viewing distances of 25 inches or less, and in certain embodiments, the computer eyewear is designed for viewing distances of 20 inches or less.

While the preferred optical power of the lenses 120 was found to vary somewhat from user to user, in general, the experimental testing revealed that an optical power of +0.5 diopters may be too strong. Some subjects who tested the +0.5 diopter lenses reported that the eyewear was disorienting. Based on the results of the experimental testing, it is believed that lenses 120 with optical power of approximately +0.2 diopters allow a high percentage of users to benefit from the reduced accommodative demand upon the eyes without causing undue discomfort or disorientation as may result in some users with lenses of greater optical power. Nevertheless, the +0.2 D power level provides noticeable and beneficial reduction of accommodative demand and magnification of the computer screen. The value of +0.2 D is meaningfully less than the amount of accommodative aid required to eliminate accommodative demand for a user with normal vision viewing a computer display at a typical working distance of 30 inches or less, which is a surprising result.

In an experiment, employees in office environments were given a pair of glasses with no optical power, +0.125 diopters, +0.25 diopters, +0.375 diopters or +0.50 diopters of optical power. The participants filled out a questionnaire both at the beginning and the end of the day. The participants were also provided additional questionnaires at the beginning of the study and at the end of the study. Notably, the participants indicated that their eyes felt more relaxed and that the computer screen was clearer and the text sharper with the eyewear having optical power. Accordingly, the test results show that the participants preferred the powered eyewear (+0.125 D, +0.25 D, +0.375 D, +0.5 D) over non-powered eyewear (0 D). The test results, however, show that most of the participants did not prefer the higher power levels, e.g., +0.5 D power or +0.375 D power and instead preferred the lower power levels of +0.125 D and +0.25 D. More participants preferred +0.375 D than +0.5 D. Also, more participants preferred +0.125 D to +0.25 D.

Accordingly, most participants preferred the eyewear with +0.25 D or less. Importantly, +0.25 D is generally the lowest increment of optical power provided in prescription eyewear. Eyeglass manufacturing labs (at least in the U.S.) are generally not equipped to reproduce power increments below +0.25 D, such as +0.2 D. Special, non-standard, molds may thus need to be used in order to create these powered lenses with optical power below +0.25 D.

While more optical power provides increased magnification of the computer screen, in various embodiments described herein, a lower optical power is selected to avoid the accompanying disorienting effects. Nevertheless, the optical power is still large enough to provide reduced accommodative demand and/or magnification that is noticeable to the wearer. Such eyewear provides immediately perceivable benefits of reduced accommodative demand and magnification but reduces effects such as disorientation when viewing objects more distant than a typical eye-to-computer display distance (e.g., greater than 30 inches).

Accordingly, in some embodiments, the optical power of the lenses 120 is greater than zero and less than or equal to +0.25 diopters. In some embodiments, the optical power of the lenses 120 is greater than or equal to +0.1 diopters, or greater than or equal to +0.125 diopters, and less than or equal to +0.25 diopters. In various embodiments, the optical power is less than +0.25 diopters. In certain embodiments, the optical power of the lenses 120 is about +0.125 diopters. In some embodiments the optical power of the lenses 120 is about +0.1 diopters. However, in some embodiments, the optical power of the lenses 120 is about +0.2 diopters. With a value from +0.125 D to +0.25 D, such as +0.2 D, the eyeglasses may be able to satisfy the majority of wearers as the study results show that the majority of participants preferred +0.125 D or +0.25 D. As described above, however, selection of about +0.2 D provides a balance between attaining a noticeable reduction of accommodative demand and magnification of the computer screen that is meaningful to the wearer while reducing disorientation when viewing objects more distant that the computer screen.

As described above, in some embodiments, the optical power of the lenses 120 is in the range from +0.1 to +0.25 diopters, or from +0.125 to +0.25 diopters. However, some wearers may be interested in additional optical power. Accordingly, in other embodiments, the optical power of the lenses 120 is in a range from +0.25 to +0.375 diopters. In some embodiments, the optical power of the lenses 120 is in range from +0.375 to +0.5 diopters.

Accordingly, in some embodiments, the optical power of the lenses 120 is from zero to +0.5 diopters, from +0.1 to +0.5 diopters, or from +0.125 to +0.5 diopters. In some embodiments, the optical power of the lenses 120 ranges from +0.1 to +0.4 diopters or from +0.125 to +0.4 diopters. In some embodiments, the optical power of the lenses 120 ranges from +0.1 diopters to +0.3 diopters or from +0.125 to +0.3 diopters. In some embodiments, the optical power of the lenses 120 is about +0.25 diopters.

Additionally, in various embodiments, the optical power of the lenses 120 is in the range from +0.3 to +0.6 diopters or from +0.4 to +0.6 diopters. In some embodiments, the optical power of the lenses 120 is about +0.5 diopters. Some embodiments comprises kits that include eyeglasses with optical power in the range from +0.1 to +0.25 diopters, or from +0.125 to +0.25 diopters, and eyeglasses with optical power in the range from +0.3 to +0.6 diopters or from +0.4 to +0.6 diopters. For example, in some embodiments, a kit comprises eyeglasses with optical power of about +0.2 diopters and eyeglasses with optical power of about +0.5 diopters. The particular optical power chosen for the lenses 120 in an embodiment may depend upon the physical set-up of the user's workspace, such as the distance between a user and his computer screen, as well as the user's viewing preferences, and, in some embodiments, the user's eyesight. In some embodiments, the eyewear 110 is off-the-shelf, non-prescription eyewear, such that the optical power in each of the lenses 120 is substantially identical.

Various lens shapes can be used to achieve the desired optical power, according to various embodiments. For example, the lenses 120 can have a convex, plano-convex, or convex-concave shape. Other shapes can also be used to achieve lenses 120 with optical power in the range from +0.1 to less than +0.5 diopters, and are known to those skilled in the art. The lenses 120 can be spherical or aspheric. While in the embodiments illustrated in FIGS. 1-3 the lenses 120 are non-progressive lenses, progressive lenses can also be used.

In addition to being designed with an amount of focusing power, the lenses 120 can also be designed to display an amount of base-in prismatic power. The resting point of vergence of normal, healthy eyes is typically more distant than the location of a computer screen or other relatively near object upon which a user fixates for long periods of time. Thus, viewing such an object places convergence demand upon the muscles of the eyes and can result in strain and other symptoms of CVS. The resting point of vergence can be drawn in closer by designing the lenses to exhibit an amount of base-in prismatic power, according to methods known in the art. The base-in prismatic power of the lenses 120 can be set such that the user's resting point of vergence is located at approximately the distance of, for example, the user's computer screen while the user is working at his computer. In some embodiments, each of the lenses 120 of the computer eyewear 110 are designed with base-in prismatic power of about 0.25-1.5 prism diopters. In other embodiments, however, the lenses 120 have approximately zero prismatic power.

A wide variety of materials can be used to form the lenses 120. The lens material may be selected based upon properties of the material, such as refractive index, strength, Abbe number, density, and hardness. For example, the lenses 120 can be formed of polycarbonate, glass, nylon, various polymers (e.g., CR-39), or plastic. In some embodiments, high-refractive index materials are used to allow for the design of thinner, lighter lenses 120 that are more comfortable to wear to extended periods of time than eyewear 110 with lenses 120 made of a lower-index material. For example, in some embodiments, the refractive index of the lens material lies approximately in the range between 1.498 and 1.9, although the refractive index can be higher or lower.

The computer eyewear 110 can be effectively used by individuals with substantially normal (e.g., approximately 20/20) uncorrected vision. The eyewear can also be effectively used by individuals with normal corrected, or spectacle, vision. For example, users who wear contact lenses can effectively use the computer eyewear 110, in addition to their contact lenses, while working at a computer to mitigate the symptoms of CVS. Some embodiments of the computer eyewear 110 are also designed to be worn by those individuals who wear prescription eyeglasses to correct their vision. For example, the computer eyewear 110 can be designed to be worn over or attach to (e.g., clip-on eyewear) the user's prescription eyewear. In addition, in some embodiments, the computer eyewear 110 can be effectively used by individuals without normal vision, such as for example, presbyopes. Various embodiments, however, are non-prescription, off-the-shelf products.

While certain symptoms of CVS are caused by straining of the eye muscles as a result of accommodation and convergence demand while viewing a relatively near object such as a computer screen for extended periods of time, other symptoms are caused by the microclimate in the vicinity of the user's eyes. If the microclimate in the vicinity of the user's eyes becomes too dry, dry eye syndrome can result, causing soreness and irritation of the eyes. This problem is particularly acute for computer users because studies have shown that for most people blink rate tends to decreases while viewing a computer screen. This problem is exacerbated in office environments by the relatively dry air from air conditioners as well as air currents from office HVAC systems that also tend to dry out the eyes of a user. Extraneous light that enters the eyes from the peripheral regions of a user's vision can also worsen the symptoms of CVS. For example, such extraneous light can result in glare and loss of contrast, which makes it more difficult for the user to view a computer screen, for example.

In some embodiments, the computer eyewear 110 has a wrap-around design to mitigate the symptoms of CVS related to the microclimate in the vicinity of a user's eyes as well as to curtail the amount of extraneous light that reaches the eyes. Wrap-around designs are not used in conventional computer eyewear. These designs are typically used to provide protection against side glare and dust or other projectiles while participating in outdoor recreational activities—protection that is generally unnecessary in an office environment. However, a wrap-around design can also help mitigate symptoms of CVS, especially when used in conjunction with other features described herein. Unlike conventional computer eyewear, embodiments of the computer eyewear 110 with a wrap-around design have a relatively high base curvature such that the computer eyewear has wrap and conforms closely to the user's face both in the frontal and peripheral regions of the user's vision. The wrap-around design improves the microclimate in the vicinity of the user's eyes by reducing air currents around the eyes and by allowing for the formation of a pocket of air on the ocular side of the lenses 120 with increased humidity relative to the ambient air on the base curve side of the lenses. In some embodiments, the wrap-around design also reduces the amount of extraneous light that enters a user's eyes from the peripheral field of vision.

One embodiment of computer eyewear 120 with a wrap-around design is illustrated in FIGS. 1-3. Unlike conventional computer eyewear, typically having a base curvature less than base 4, the base curvature of the frame 115 and lenses 120 maintains a relatively close fit to the user's face even at the peripheral regions of the user's field of view. In addition to closely following the curvature of a user's head, the frame 115 and lenses 120 of the eyewear 110 can be designed to complementarily follow the contours of a typical user's facial features to maintain a small separation distance between the frame 115 and the user's face. For example, the frame 115 and lenses 120 can be designed to maintain no more than a small degree of separation with the user's brow and cheekbones.

In some embodiments, the separation between the brow and an upper aspect, such as the upper edge, of the frame 115 (e.g., in the z-direction) is 12 mm or less. For example, in some embodiments, the separation between the brow and an upper aspect of the frame 115 is approximately 2-5 mm. In some embodiments, the separation between the brow and an upper aspect of the frame 115 is less than approximately 2 mm. In some embodiments, the distance between the cheekbone and a lower aspect, such as the lower edge, of the frame 115 (e.g., in the z-direction) is less than 5 mm. For example, in some embodiments, the separation between the cheekbone and a lower aspect of the frame is approximately 1-3 mm. In some embodiments, the separation between the cheekbone and a lower aspect of the frame is less than approximately 1 mm. In some embodiments, the separation between the temple region and the frame 115 (e.g., in the z-direction) is 35 mm or less. For example, in some embodiments, the separation between the temple region and the frame 115 is approximately 5-10 mm. In some embodiments, the separation between the temple region and the frame 115 is less than approximately 5 mm. In some circumstances, a standard anatomical human head form can serve as a useful indicator of dimensions of a typical user's head and facial features.

Whereas in the case of conventional computer eyewear the peripheral region of a user's field of view is left exposed, the computer eyewear 110 of FIGS. 1-3 protects the user's eyes against air currents and extraneous light that could cause symptoms of CVS. In some embodiments, at least a portion of the computer eyewear 110 (e.g., the frame and/or the lenses) has a base curvature of base 5 or higher. In other embodiments, at least a portion of the computer eyewear 110 (e.g., the frame and/or the lenses) has a base curvature of base 6 or higher. In other embodiments, at least a portion of the computer eyewear 110 (e.g., the frame and/or the lenses) has a base curvature of base 8 or higher. In other embodiments, at least a portion of the computer eyewear 110 (e.g., the frame and/or the lenses) has a base curvature of base 10 or higher. As a result, the frame 115 and lenses 120 exhibit wrap. In addition, in some embodiments, the computer eyewear 110 is designed with an amount of pantoscopic tilt, or rake.

With reference to FIG. 1, in some embodiments the lenses 120 extend from their medial edge in the ±y-direction by a distance d1, and from the front surface in the z-direction by a distance d2. In some embodiments, d1 is approximately 45-70 mm and d2 is approximately 20-40 mm. In some embodiments, the ratio of d1 to d2 is approximately 1.5-3.5.

The wrap-around computer eyewear 110 improves the microclimate in the vicinity of the user's eyes by blocking a portion of the air flow around the eyes that exists when a user wears a conventional pair of computer eyewear. Since air flow to the eyes is decreased, the amount of water vapor from the natural moisture of the eyes that is carried away by the air flow is also decreased. As a result, the air in a pocket formed around the eyes by the wrap-around computer eyewear 110 has a higher level of humidity than the ambient air. The increased humidity in a pocket of air trapped between the wrap-around computer eyewear 110 and the user's face helps to reduce dryness of the eyes and other associated symptoms of CVS. While in some embodiments, all or portions of the frame 115 of the computer eyewear 110 may be designed to be in physical contact with a user's face to form a sealed chamber around the eyes, in other embodiments, the microclimate around the user's eyes can be enhanced appreciably if all or portions of the frame 115 are designed to closely conform to facial features, as described herein, though without forming a sealed chamber. Computer eyewear 110 that is not designed to form a sealed chamber around the eyes may be more comfortable to some users than computer eyewear 110 with a sealed chamber around the eyes.

In some embodiments, the design of the computer eyewear 110 blocks sufficient air flow around the eyes to allow for the percent relative humidity of the air on the ocular curve-side of the eyewear 110 to reach a level that is ten percentage points higher than the percent relative humidity of the ambient air. In some embodiments, the percent relative humidity of the air on the ocular curve-side of the computer eyewear 110 is at least about 40% or higher, while in some embodiments it lies in the range between about 40% and 60%.

Figure 12:
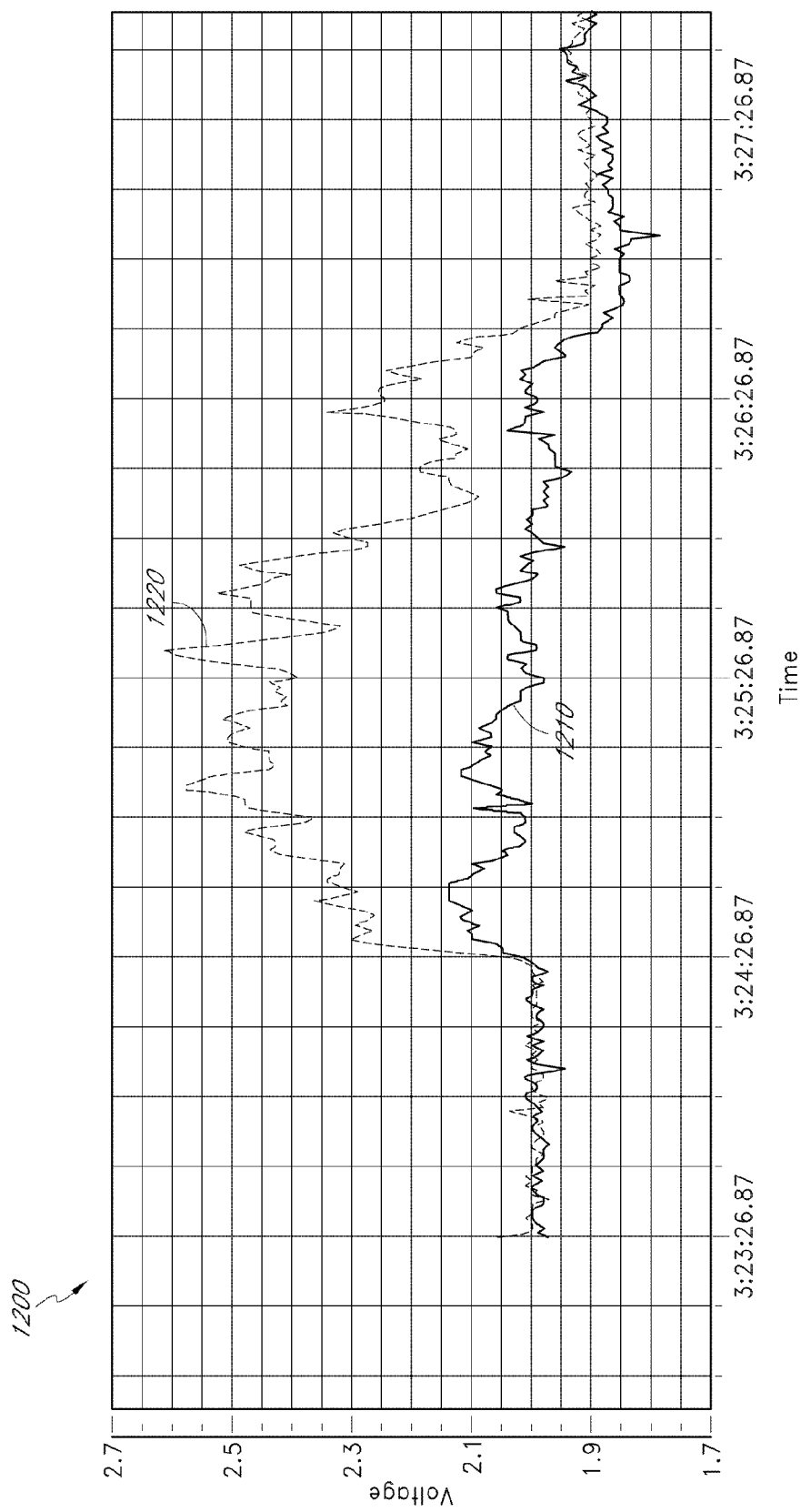
FIG. 12 is a plot that illustrates measured humidity on the ocular side of the lenses of an embodiment of computer eyewear in use versus the humidity on the exterior surface of the lenses.

FIG. 12 is a plot that illustrates measured humidity on the ocular side of the lenses of an embodiment of the computer eyewear (e.g., 110) in use versus the humidity on the exterior surface of the lenses. Honeywell HIH series DC humidity sensors were used to measure the humidity of air inside the user's ocular pocket (i.e., the space between a lens and the eye) as compared to the humidity outside the ocular pocket. One humidity sensor was placed on the ocular side of a lens of the computer eyewear (e.g., 110) while another was placed on the exterior surface of the lens. The plot 1200 in FIG. 12 shows the electrical voltage of the two humidity sensors plotted as a function of time. The bottom curve 1210 illustrates the output of the sensor that was positioned on the exterior of the lens, while the top curve 1220 illustrates the output of the sensor that was positioned on the ocular side of the lens. As illustrated, the humidity inside the ocular pocket was measurably greater than the humidity of the ambient air. When converting the outputs of the two sensors into relative humidity measurements and considering data from a wide variety of users, it has been determined that the computer eyewear described herein increased humidity levels inside the ocular pocket by an average of about 10%, and by as much as about 25%.

While the wrap-around configuration illustrated in the computer eyewear 110 of FIGS. 1-3 advantageously helps to regulate the microclimate around a user's eyes as well as blocking some extraneous light, under some circumstances it can also have a deleterious impact on the optical performance of the lenses 120. For example, if the lenses 120 are canted with respect to a user's forward line of sight to provide wrap while the computer eyewear 110 is in the as-worn position, a degree of base-out prismatic power may be introduced along with other optical distortions. In addition, pantoscopic tilt can induce cylindrical optical power in the lenses 120, along with other optical distortions. These optical distortions can, however, be corrected to a certain extent by implementing decentered lenses in the computer eyewear 110.

Figure 4:
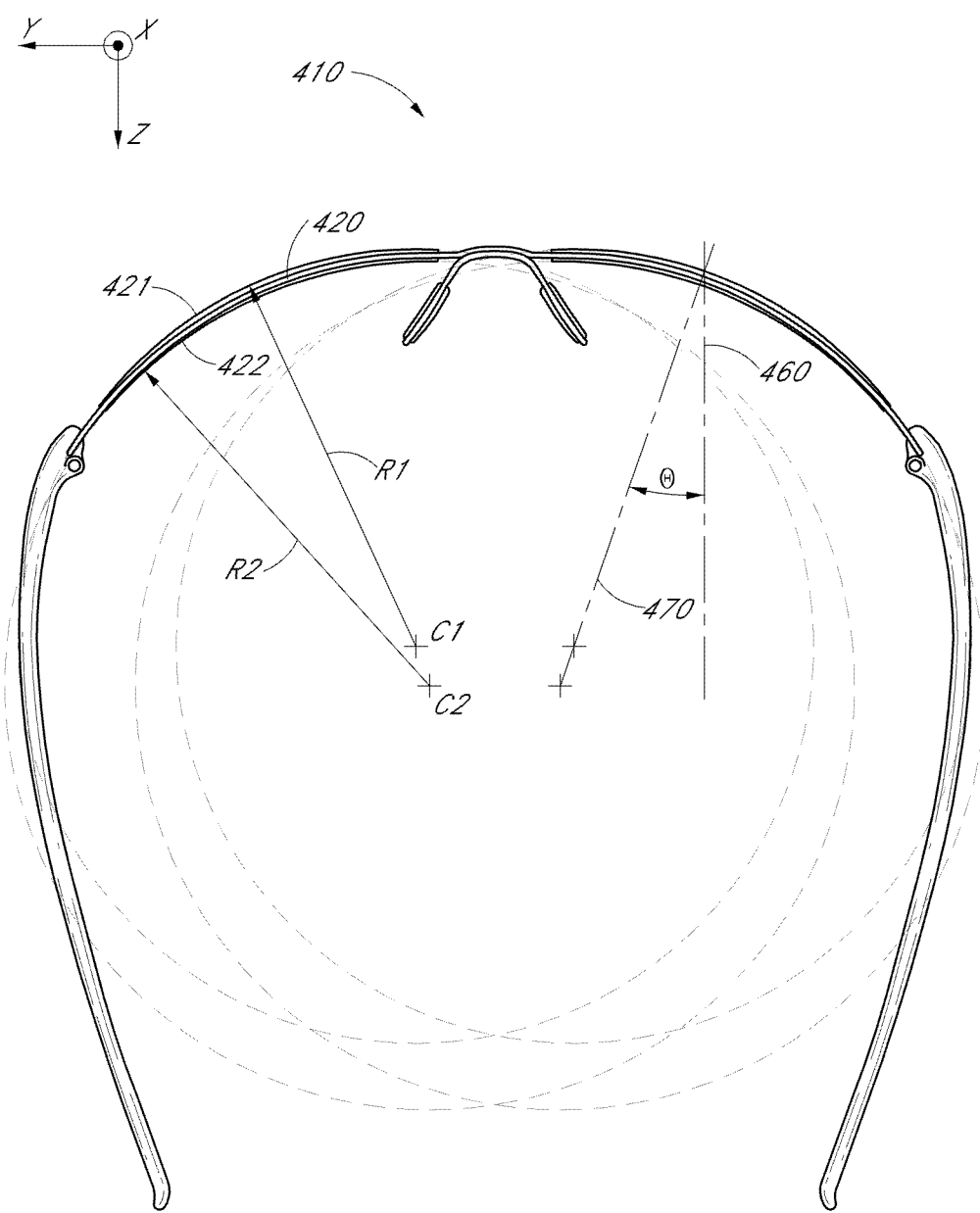
FIG. 4 is a diagram of eyewear with decentered lenses for use in a wrap-around design, according to one embodiment.

FIG. 4 is a diagram of eyewear 410 with decentered lenses 420 for use in a wrap-around and/or raked design, according to one embodiment. Front and rear surfaces of one of the decentered lenses 420 follow a first arc 421 and a second arc 422, respectively. The first arc 421 is a portion of a circle with radius R1 and a center point C1. The first arc 421 defines a convex surface. The second arc 422 defines a concave surface and is a portion of a circle with radius R2 that, in some embodiments, is greater than R1. The circle that defines the second arc 422 has a center point C2 that is offset from C1. In some embodiments, the center point C2 of the second arc 422 is set away from the lenses 420 and to the medial side of C1. Thus, in some embodiments, the lenses 420 are convex-concave lenses with an amount of positive optical power. In some embodiments, the lenses 420 have at least +0.1 diopters of positive optical power and less than +0.5 diopters of positive optical power.

In FIG. 4, an optical center line 470 is drawn between the center points C1 and C2. The optical center line 470 intersects the thickest portion (i.e., the optical center) of the lens 420. A geometric center of the lens 420 can be defined in ways known by those of skill in the art (e.g., at the intersection of an A line, that defines the horizontal width of the lens, with a B line, that defines the vertical height of the lens). In addition, a forward line of sight 460 is drawn to indicate the direction of a user's line of sight while looking straight forward. As shown in FIG. 4, the optical center line 470 and the forward line of sight 460 are separated by an angle θ. Thus, in one embodiment, the optical center line 470 and the forward line of sight 460 are not parallel. In other embodiments, however, the optical center line 470 is parallel with the forward line of sight 460, while in still other embodiments, the angle θ is negative as compared to how it is illustrated in FIG. 4.

The decentered lenses 420 can be configured to correct the base-out prismatic power that would otherwise be introduced in a non-decentered lens due to the canted orientation of the lenses 420 in a wrap-around design of computer eyewear. Reduction or correction of the base-out prismatic power can be accomplished by adding an amount of base-in prismatic power. The amount of prismatic power can be controlled by varying the location of the center point C2 with respect to C1. This variation can consequently vary the angle θ between the optical center line 470 and the forward line of sight 460, as well as the distance between the center points C1 and C2.

One way of adding base-in prismatic power is to decenter the optical center of the lens 420 medially with respect to the geometric center. For example, the lenses can be designed such that the distance between the optical centers of the left and right lenses 420 is less than a given pupillary distance such that the optical centers of the lenses 420 are offset medially from the y positions of the user's pupils. In non-prescription embodiments, the distance between optical centers of the left and right lenses 420 can be chosen with respect to a pupillary distance that is representative of a wide range of users. For example, the population median pupillary distance of approximately 62 mm can be chosen, though the lenses 420 can also be designed for other pupillary distances. In other embodiments, the optical center of the lens 420 can be decentered laterally with respect to the geometric center.

In some embodiments, the decentered lenses 420 are configured to cancel out the base-out prismatic power otherwise introduced by the wrap-around design so that the lenses 420 of the computer eyewear have substantially no prismatic power. In other embodiments, the decentered lenses 420 are configured to cancel out the base-out prismatic power as well as adding an amount of base-in prismatic power to reduce the convergence demand upon the eye muscles while viewing, for example, a relatively near computer screen. The amount of prism induced by the decentration can be calculated with Prentice's Rule. Besides being decentered in the ±y direction, as illustrated in FIG. 4, the optical centers of the lenses 420 can also be decentered in the ±x direction to help correct optical distortions induced by pantoscopic tilt. For example, the optical centers of the lenses 420 can be decentered upward or downward with respect to the geometric centers of the lenses 420 based on the pantoscopic tilt.

Figure 5:
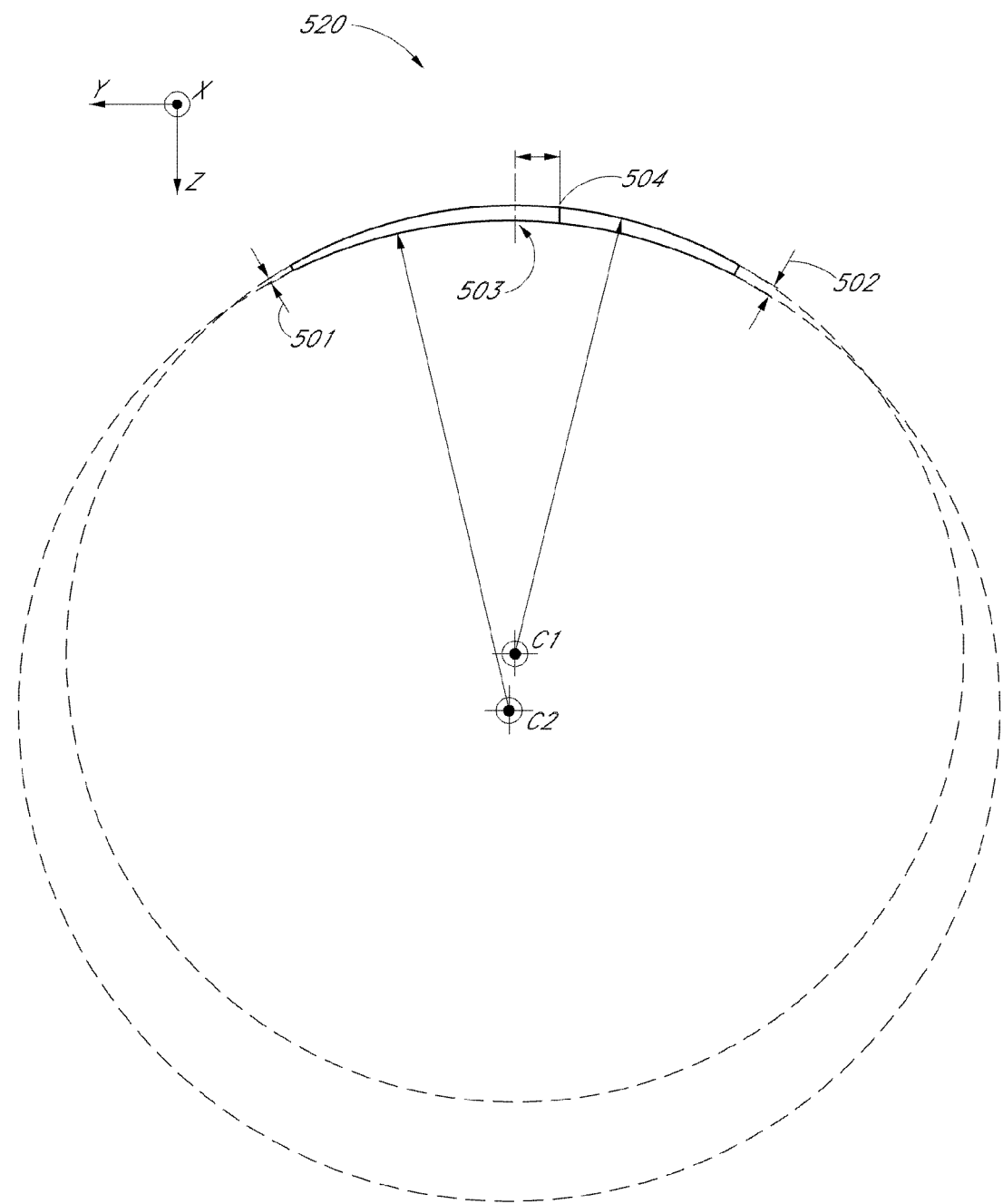
FIG. 5 is a magnified cross-sectional view of a lens of FIG. 4.

FIG. 5 is a magnified cross-sectional view of a lens 520 of FIG. 4. Several measurements of the lens 520 are indicated on FIG. 5, including R1, R2, the lateral end thickness 501, the medial end thickness 502, and the distance between the midpoint 503 of the lens 520 and the thickest point 504 of the lens 520. As illustrated in FIG. 5, the medial end thickness 502 and the lateral end thickness 501 are each less than the thickness of the lens 520 at the thickest point 504. Moreover, the medial end thickness 502 is greater than the lateral end thickness 501. The thickest point 504 of the lens 520 is closer to the medial edge than to the lateral edge of the lens 520. As disclosed herein, the lens 520 has a degree of positive optical power in some embodiments. Moreover, while FIG. 5 illustrates a converging convex-concave lens 420, in other embodiments different types of converging lenses can be used. In one embodiment, the lens 520 is a base 8 decentered lens with +0.2 diopters of optical power. In another embodiment, the lens 520 is a base 6 decentered lens with +0.2 diopters of optical power.

Figure 6:
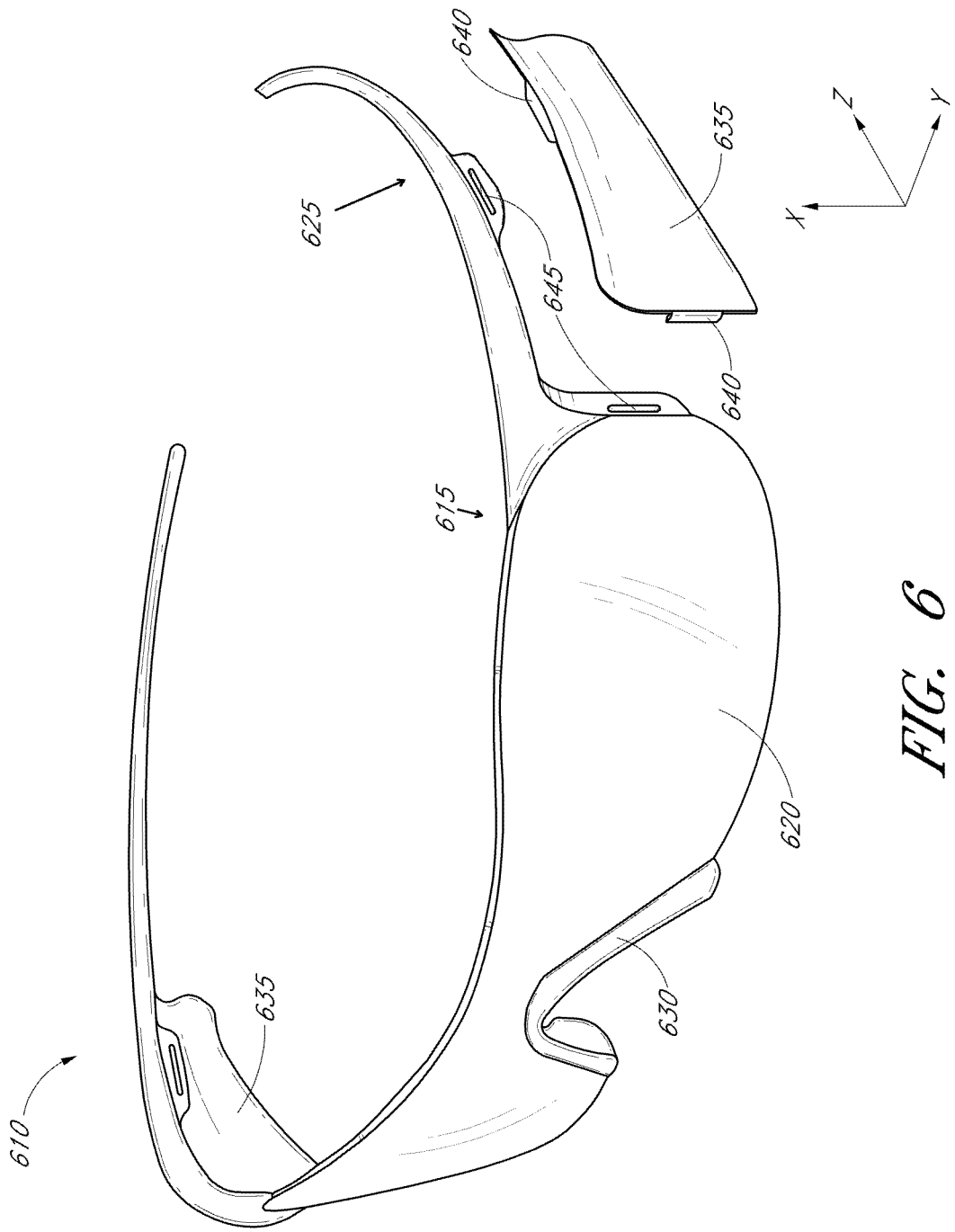
FIG. 6 is a perspective view of eyewear that includes removable side-shields for reducing symptoms of computer vision syndrome, according to one embodiment.

In addition to the wrap-around design for computer eyewear disclosed herein, other features can also be used to enhance the microclimate around a user's eyes. For example, some embodiments include removable side-shields that can reduce air flow to the eyes. FIG. 6 is a perspective view of eyewear 610 that includes removable side-shields 635 for reducing symptoms of CVS. The computer eyewear 610 has a unitary lens with positive optical power, a frame 615, ear stems 625, and a nose piece 430, as described herein. The computer eyewear 610 also includes removable side-shields 635. The side-shields 635 are configured to removably connect to and from the computer eyewear 610, thus permitting the user to decide under what circumstances to use the side-shields. The removable side-shields 635 are configured, in shape and size, to substantially reduce air flow to the eyes from the lateral regions of the computer eyewear 610. For example, in the embodiment illustrated in FIG. 6, the removable side-shields 635 help to close the space between the ear stems 625 and the side portion of a user's face, including the cheekbone and temple area.

In one embodiment, the dimensions of the removable side-shields 635 are approximately 20-80 mm in the z dimension and approximately 15-50 mm in the x dimension at the front of the computer eyewear, tapering down to approximately 5 mm at the rear (e.g., nearer the user's ear). While, FIG. 6 illustrates computer eyewear 610 with a wrap-around design, the removable side-shields 635 can also be used with computer eyewear without a wrap-around design.

The removable side-shields 635 have tabs 640 for removably fastening the side shields 635 to the frame 615 and ear stems 625 of the computer eyewear 610. The tabs 640 are configured to complementarily mate with apertures 645 located in the frame 615 and ear stems 645 where they are securely held in place. In some embodiments, the removable side-shields 635 attach to the frame 615 and/or ear stems 625 in a snap-on fashion. While FIG. 6 illustrates connection points between the tabs 635 and apertures 645 at the frame 615 and ear stems 625, the connection points could be limited to only the frame 615 or only the ear stems 625. In addition, the removable side-shields could connect to the lens 620, or to some other portion of the computer eyewear 620. While a suitable tab/aperture fastener for removably attaching the side shields 635 to the computer eyewear 610 is illustrated in FIG. 6, those of ordinary skill in the art will recognize that many different types of fasteners could be used equally well. For example, friction fit fasteners, claw fasteners, sliding groove fasteners, or magnetic fasteners can all be used to removably attach the side shields 635 to the computer eyewear 610 in various embodiments.

The removable side-shields 635 can be made of a variety of materials. For example, metals and plastics are suitable materials. In one embodiment, the removable side-shields 635 are made of the same material as the frame 615 and ear stems 625 of the computer eyewear 610. In addition, the removable side-shields 635 can be transmissive to light or substantially opaque. In embodiments where the removable side-shields 635 are substantially opaque, they can perform the additional role of reducing the amount of extraneous light that is incident upon the eyes from the user's peripheral field of vision, along with symptoms of CVS related to such extraneous light.

The lenses 120 of certain embodiments of the computer eyewear 110 include one or more optical treatments to alter the optical performance of the lenses 120. For example, the lenses 120 may include a partial mirror coating that comprises one or more metal and/or dielectric layers formed on the lenses 120 (e.g., an aluminum coating, a $\lambda/4$ stack, etc.). The partial mirror coating can be formed by vacuum deposition, physical vapor deposition, lamination of a sheet of reflective material on a lens surface, for example, with an adhesive, or any other thin film coating technology. In some embodiments, the partial mirror coating is at least 15% reflective across all, or a portion of, the visible spectrum of light from about 340 nm to about 780 nm. In some embodiments, the reflectivity of the partial mirror coating is greater than 95% reflective for all or a portion of the visible spectrum.

The lenses 120 can also include a tint. The tint may comprise a pigment, dye, optically absorptive layer, a photoreactive dye, or a tinting material laminated onto a lens surface, for example. In addition, in some embodiments, the lenses 120 include an anti-reflective (AR) coating. The AR coating can comprise one or more thin films formed on the surface of a lens through vacuum deposition, physical vapor deposition, lamination of an AR layer on a lens surface, or some other method.

In some embodiments, the optical treatments are uniform across the surface of the lenses 120, while in other embodiments they are non-uniform. Some embodiments include a first optical treatment that is uniform, and a second optical treatment that is non-uniform. Moreover, in some embodiments an optical treatment covers greater than 90% of a surface of the lenses 120, while in other embodiments the optical treatment covers 50%-90% of a lens surface, 10%-40% of a lens surface, or less than 10% of a lens surface.

Optical coatings and treatments such as the types described herein can be used to spectrally filter light that passes through the lenses of the computer eyewear. This type of spectral filtering can be done to modify the spectrum of light that is incident upon the eyes in ways that help to reduce symptoms of CVS. For example, in some embodiments, optical coatings as well as other types of treatments are applied to the lenses to attenuate peaks in the spectra of typical fluorescent and incandescent lighting found in homes and offices. This can be done, for example, with a partially transmissive mirror coating, tinting, a combination of the same, or the like.

Figure 7A:
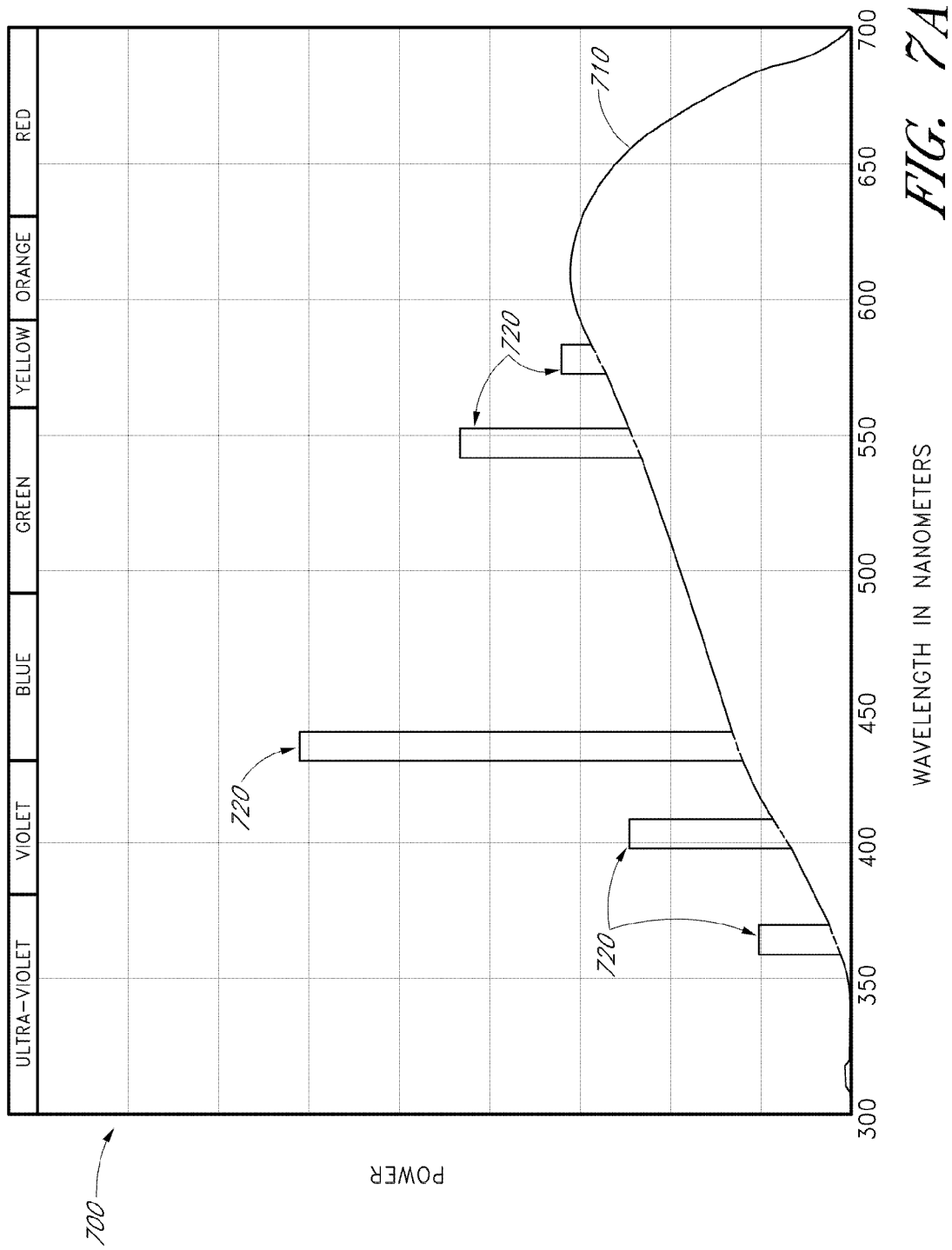
FIG. 7A is a plot of the visible spectral emission of a typical fluorescent lamp.

FIG. 7A is a plot 700 of the visible spectral emission of a typical fluorescent lamp. The curve 710 indicates power of the spectral emission of the fluorescent lamp as a function of wavelength. The curve 710 includes peaks 720, such as those seen at approximately 360 nm, 400 nm, 440 nm, 550 nm, and 575 nm. A plot of the spectral emission of a typical incandescent lamp, while not shown, has similar spectral peaks. The spectral peaks in these typical sources of lighting can result in poor contrast when viewing, for example, a computer screen. This in turn can cause the eyes to strain. People generally tend to prefer the viewing conditions presented by a more balanced spectrum as opposed to the viewing conditions under light with defined spectral peaks.

The generic fluorescent lighting spectrum illustrated in FIG. 7A is only an example. There are different types of fluorescent lights, the spectrum of each of which may have different properties in terms of the number of spectral peaks, their locations, and/or their relative height. One common characteristic of many fluorescent lights, however, is that they include mercury vapor. The mercury vapor may result in the presence of distinctive spectral peaks in the spectrum of such fluorescent lights that correspond to resonant frequencies of the mercury atoms. For example, two of these peaks are located at about 440 nm and at about 550 nm. Thus, different varieties of fluorescent lights may include spectral peaks at or near these wavelengths.

Some embodiments of the computer eyewear 110 include optical treatments (e.g., tints, mirror coatings, etc.) applied to the lenses 120 to attenuate or otherwise desirably affect spectral peaks (e.g., 720) in various types of artificial lighting. For example, various embodiments include optical treatments for attenuating spectral peaks in fluorescent lighting as seen in FIG. 7A. Other embodiments can be customized for other types of lighting or for fluorescent lighting with different spectral peaks than those illustrated in FIG. 7A. Optical treatments with the desired spectral characteristics for attenuating spectral peaks in various types of lighting can be designed using techniques known in the art.

Such optical treatments may have spectral filtering properties with transmission curves that exhibit one or more separately identifiable, engineered features for selectively affecting or filtering spectral peaks in, for example, fluorescent lighting. The transmission curve features may include, but are not limited to, stop bands, ramps, plateaus, fall-offs, dips, shoulders, etc., or combinations of the same. The transmission curve features may also be more complicated shapes. Each engineered transmission curve feature can selectively affect one peak in the spectrum of, for example, fluorescent lighting, or each feature can selectively affect multiple peaks that, for example, are clustered together, overlap, or are otherwise relatively tightly grouped. In some embodiments, the transmission curve of the optical treatment desirably selectively affects (e.g., attenuates) a spectral peak at a resonant frequency of mercury (e.g., about 440 nm or 550 nm).

In some embodiments, the width of the engineered features of the transmission curve can be determined based on the width of the corresponding spectral peak which the feature is designed to selectively affect. In some embodiments, the width of the engineered feature substantially matches the width of the peak which it is designed to affect. In other embodiments, the width of the engineered feature can be less than that of the corresponding spectral peak so as to affect only a portion of the peak, or it can be greater than the width of the corresponding spectral peak so as to, for example, affect multiple spectral peaks. In some embodiments, the width of the engineered feature is no more than about 10% greater than the width of the corresponding spectral peak or group of peaks. In some embodiments, the width of the engineered feature is no more than about 20% greater than the width of the peak(s), 30% greater than the width of the peak(s), 50% greater than the width of the peak(s), 80% greater than the width of the peak(s), or 100% greater than the width of the peak(s). In some embodiments, the width of the engineered feature is more than 100% greater than the width of the peak(s). In terms of actual dimensions, in some embodiments, the width of the engineered feature is greater than 50 nm wide, 40-50 nm wide, 30-40 nm wide, 20-30 nm wide, 10-20 nm wide, or less than 10 nm wide. In some embodiments, the width of the engineered feature is less than 50 nm wide, less than 40 nm wide, less than 30 nm wide, less than 20 nm wide, or less than 15 nm wide.

A single transmission curve may include more than one feature for desirably affecting spectral peaks of, for example, fluorescent lighting. For example, the transmission curve for the lenses of a pair of eyewear may have at least two engineered features, or at least three engineered features, for desirably affecting spectral peaks of fluorescent lighting. Each of these features may have the same width and shape or different widths and different shapes. The transmission curve features may fully or partially attenuate the transmission of light through the optical treatment for one or more specific spectral peaks of a given type of lighting. For example, in some embodiments, a particular feature engineered to beneficially affect the spectrum of incident lighting may transmit about 5% or less of incident light at the wavelength or wavelengths where the feature is located. In other embodiments, the engineered feature may transmit, for example, 5-10% of incident light, 10-30% of incident light, 30-50% of incident light, 50-70% of incident light, 70-90% of incident light, or 90-95% of incident light.

For example, in one embodiment, an optical treatment for attenuating the peaks 720 in the lighting spectrum 710 shown in FIG. 7A has stop bands at approximately 360 nm, 400 nm, 440 nm, 550 nm, and/or 575 nm. The positions of the stop bands are selected to correspond to the positions of peaks in output spectrum 710 of the fluorescent lighting. The width of the stop bands (e.g., in a full width at half maximum sense)

can be in the range of about 25 nm to about 150 nm wide in some embodiments, although the widths may be larger or smaller. In some embodiments, the width of the stop band may substantially equal the spectral width of a peak 720 in the emission spectrum of the lighting.

In some embodiments, the stop bands reduce the transmission of light through the lenses 120 by at least about 50%. Furthermore, in some embodiments, the attenuation of transmitted light provided by each stop band is designed to be proportionate, or otherwise related, to the height of the particular spectral peak which it is designed to attenuate. For example, the stop band at 440 nm can provide greater attenuation than the stop band at 360 nm. The precise characteristics of a spectral filter for attenuating peaks in the output spectrum 710 can vary widely, as will be appreciated by those of skill in the art. In this way, the optical treatment advantageously balances the spectrum of light that reaches a user's eyes. This balanced spectrum results in more natural viewing conditions that can lessen eye strain. In a similar manner, optical treatments can be designed to balance the spectrum of incandescent lighting as well as other types of lighting.

Figure 7B:
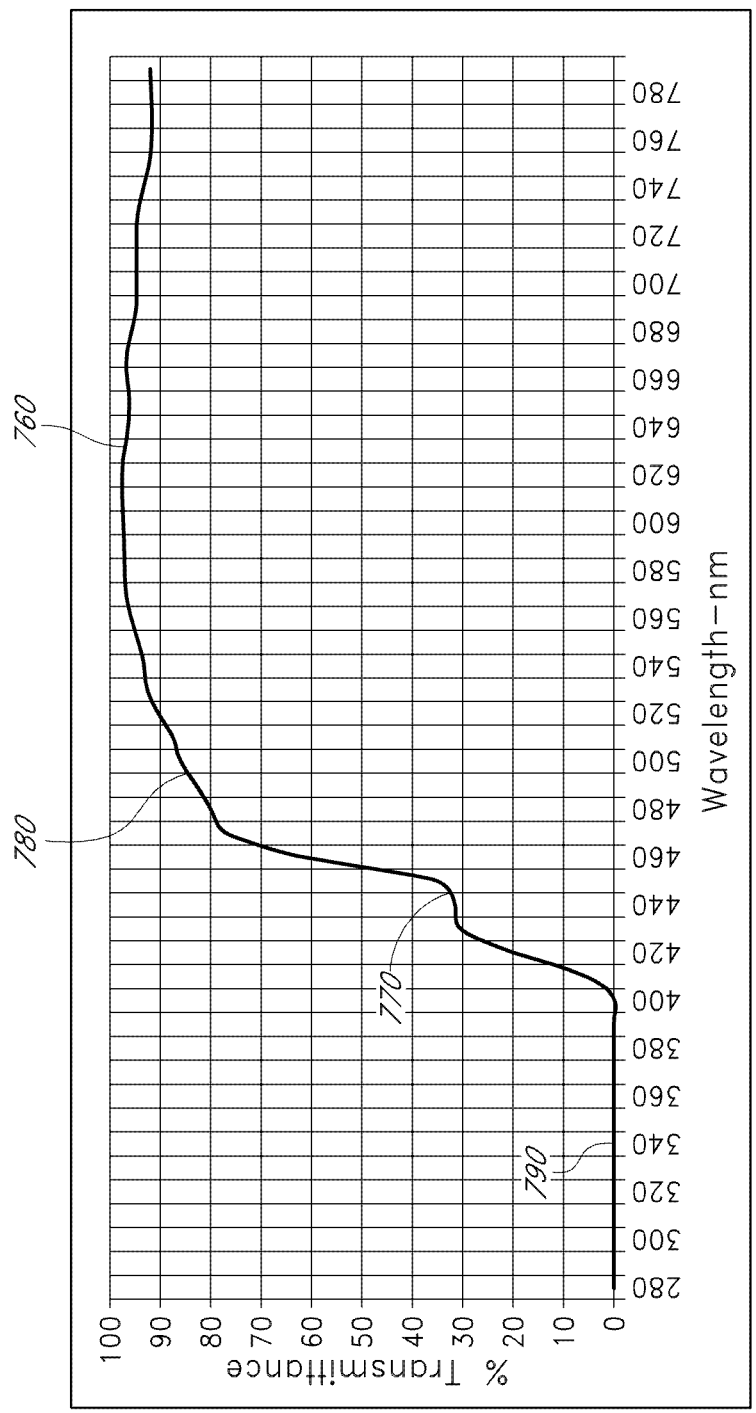
FIG. 7B is a plot of an example transmission curve of an optical treatment for performing spectral filtering of light incident upon a lens.

FIG. 7B is a plot 750 that illustrates an example transmission curve 760 of an optical treatment. The percent transmittance of light through the optical treatment is plotted as a function of wavelength. The transmission curve 760 includes at least two features for desirably affecting the spectral peaks of fluorescent lighting. For example, the transmission curve 760 includes an engineered plateau 770 at about 440 nm. The plateau 770 corresponds to a resonant frequency of mercury in fluorescent lighting that is likewise located at about 440 nm. The plateau 770 extends from about 430 nm to about 450 nm for a width of about 20 nm, though the width of this or another engineered transmission curve feature could be greater or smaller, for example, to correspond with the width of a particular spectral peak. The plateau 770 transmits slightly more than 30% of light at this range of wavelengths, though in other embodiments it could be engineered to transmit a larger or smaller percentage of light.

The transmission curve 760 also includes a relatively smooth engineered ramp 780 that extends from about 475 nm through 550 nm. This ramp 780 affects yet another resonant frequency of mercury in fluorescent lighting that is located at about 550 nm. The ramp 780 may also affect at least one other spectral peak (e.g., a peak located at about 480 nm in some types of fluorescent lighting). The ramp 780 reduces the amount of light that is transmitted over these wavelengths by 5-20%, though it could be engineered to affect light over this wavelength range to a greater or lesser extent. In addition, the width of the ramp 780 could be reduced to more closely discriminate against the spectral peak at 550 nm or some other spectral peak.

The presence of the engineered features (e.g., the plateau 770 and the ramp 780) of the transmission curve 760 reduce the amount of light at certain peak wavelengths of fluorescent lighting, thus tending to smooth, or otherwise beneficially impact, the spectrum of fluorescent lighting that is ultimately incident upon the user's eyes. While the transmission curve 760 illustrated in FIG. 7B includes features for affecting spectral peaks at about 440 nm and 550 nm, other embodiments may include additional or different separately identifiable, engineered features located at different wavelengths.

The transmission curve 760 also includes a relatively broad stop band portion 790 that attenuates ultraviolet and blue wavelengths, resulting in a generally yellow appearance. In some embodiments, it is desirable to more significantly attenuate blue light than green or red, thus rendering a warmer viewable spectrum to the user. A warm energy spectrum with attenuated blues may be physiologically preferred when viewing a computer display, reading, or performing some other concentrated task because such tasks are performed with the central vision at the fovea. The fovea includes high concentrations of red and green cones, whereas blue cones are found mostly outside of the fovea. Thus, warmer energy spectrums more efficiently stimulate cones located at the fovea during tasks that are performed with the central vision. This broad stop band portion 790 does not selectively attenuate a particular spectral peak or group of spectral peaks in, for example, fluorescent lighting; instead, it is meant to filter a relatively large portion of, for example, the visible spectrum. In FIG. 7B, the broad stop band portion attenuates wavelengths below about 400 nm and is at least about 120 nm wide. In other embodiments, it may be at least 150 nm wide or at least 200 nm wide. The broad stop band portion 790 is provided in addition to the above-described features for selectively affecting (e.g., attenuating) a specific peak, or group of peaks, in the spectrum of ambient lighting (e.g., fluorescent lighting).

Balancing the spectrum of ambient light (e.g., fluorescent office lighting) can also have other benefits. For example, in some cases the light emitted from a backlit computer display does not share one or more of the spectral peaks of the ambient lighting that the optical treatment is designed to attenuate. In these cases, the optical treatment preferentially attenuates ambient lighting over light emitted from the computer display. In some circumstances, light that is incident upon the eyes from sources (e.g., overhead office lighting) other than a backlit computer display being viewed by the user can be considered as a source of optical "noise" that makes it more difficult for the user to view the computer display without straining. By preferentially attenuating light from these sources of noise, the ratio of light from the computer display to ambient lighting noise is increased, resulting in more comfortable viewing of the computer display and reduced symptoms of CVS.

In some embodiments, the optical treatment for balancing the output spectrum of fluorescent lighting, or any other type of lighting, is a partially transmissive mirror coating. While a tint can also be used for this purpose, the spectral characteristics of a partially transmissive mirror coating can generally be customized to a greater extent. For example, the spectral locations of various stop bands in a partially transmissive mirror coating can be customized to a greater extent than in the case of tinting. In addition, these stop bands can be designed to attenuate incident light by a greater amount, making the stop bands deeper than is generally possible with tinting. Nevertheless, in other embodiments, the optical treatment is a tint applied to the lenses of the computer eyewear 110 that attenuates transmitted light primarily by introducing absorptive loss. In still other embodiments, the optical treatment comprises both a partially transmissive mirror coating as well as an optically absorptive tint. The use of both a mirror coating and tinting can be advantageous in that it allows for an extra degree of freedom to customize the spectral response of the optical treatment.

In some embodiments, the computer eyewear includes optical treatments to provide a relaxing, calming, and soothing light environment for the eye. Table 1 provides example transmission data engineered for such an optical treatment. These values are based on an average of twenty samples.

TABLE 1

Example transmission data engineered for an optical treatment.

| nm | T % | nm | T % | nm | T % | nm | T % | nm | T % |
|---|---|---|---|---|---|---|---|---|---|
| 780 | 95.63 | 770 | 95.78 | 760 | 96.28 | 750 | 96.45 | 740 | 96.82 |
| 730 | 97.33 | 720 | 97.65 | 710 | 97.98 | 700 | 98.21 | 690 | 98.40 |
| 680 | 98.65 | 670 | 98.72 | 660 | 98.85 | 650 | 99.00 | 640 | 99.10 |
| 630 | 99.10 | 620 | 99.02 | 610 | 98.79 | 600 | 98.50 | 590 | 97.98 |
| 580 | 97.36 | 570 | 96.48 | 560 | 95.38 | 550 | 94.02 | 540 | 91.63 |
| 530 | 88.65 | 520 | 85.42 | 510 | 82.51 | 500 | 79.72 | 490 | 76.50 |
| 480 | 72.93 | 470 | 69.26 | 460 | 60.28 | 450 | 42.92 | 440 | 34.76 |
| 430 | 33.53 | 420 | 23.84 | 410 | 8.96 | 400 | 2.07 | 390 | 1.85 |
| 380 | 2.32 | 370 | 2.18 | 360 | 1.85 | 350 | 1.31 | 340 | 1.08 |
| 330 | 1.47 | 320 | 1.82 | 310 | 0.00 | 300 | 0.00 | 290 | 0.21 |
| 280 | 1.83 | | | | | | | | |

Figure 7C:
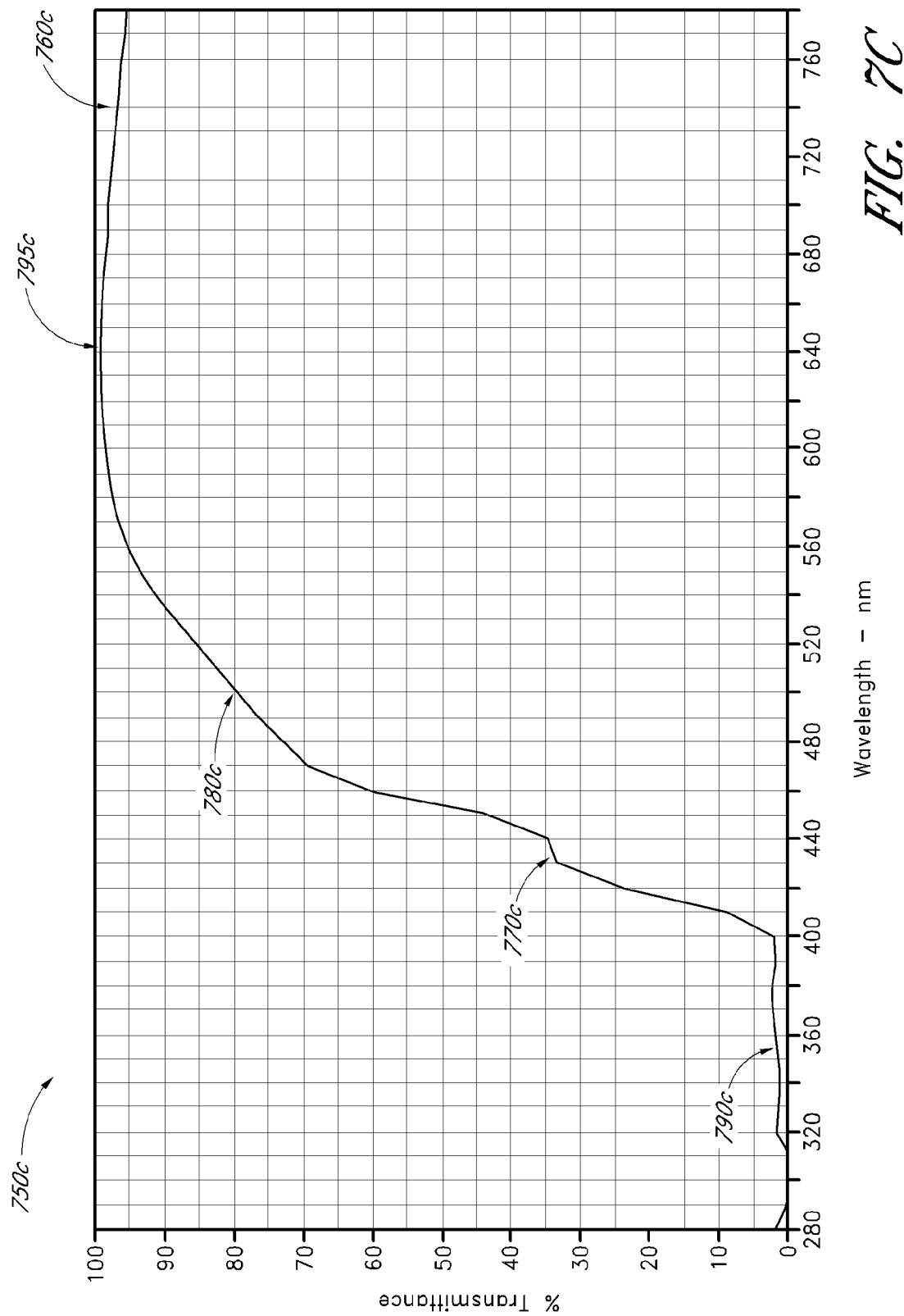
FIG. 7C is a plot of an other example transmission curve of an optical treatment for performing spectral filtering of light incident upon a lens.

FIG. 7C is a plot 750c illustrating the example data from Table 1. The percent transmittance of light through the optical treatment is plotted as a function of wavelength. The plot 750c is an example transmission curve of an optical treatment for performing spectral filtering of light incident upon a lens. The transmission curve 760c includes an engineered stop band portion 790c that attenuates ultraviolet and blue wavelengths, resulting in a generally yellow appearance. Certain embodiments provide computer eyewear with a yellow tint that provides spectral filtering characterized by such a transmission curve 760c. When viewed through the lenses, white objects can appear as a yellow hue. However, various embodiments do not distort colors dramatically, e.g., in some embodiments, blue objects may change slightly towards the warmer spectrum of green through the overlay of the yellow tint. Thus, as mentioned herein, in some embodiments, it is desirable to significantly attenuate blue light more than green or red light to render a warmer viewable spectrum to the user. Additionally, high concentrations of red and green cones are located at the fovea whereas high concentrations of blue cones are located outside of the fovea. The warmer energy spectrum of 760c in FIG. 7C can efficiently stimulate cones located at the fovea, during concentrated tasks, e.g., reading or viewing a computer display, that are performed with central vision. Without subscribing to any particular scientific theory, it is possible that because the fovea with the higher density of nerve endings is used for reading, that blue light is less useful for reading a computer screen and thus can be attenuated without dramatic decrease in the computer eye wearer's ability to read the computer screen. However, by reducing the blue light, the pupil in the eye may possibly enlarge to collect more light, and in particular more red and green light.

Figure 7D:
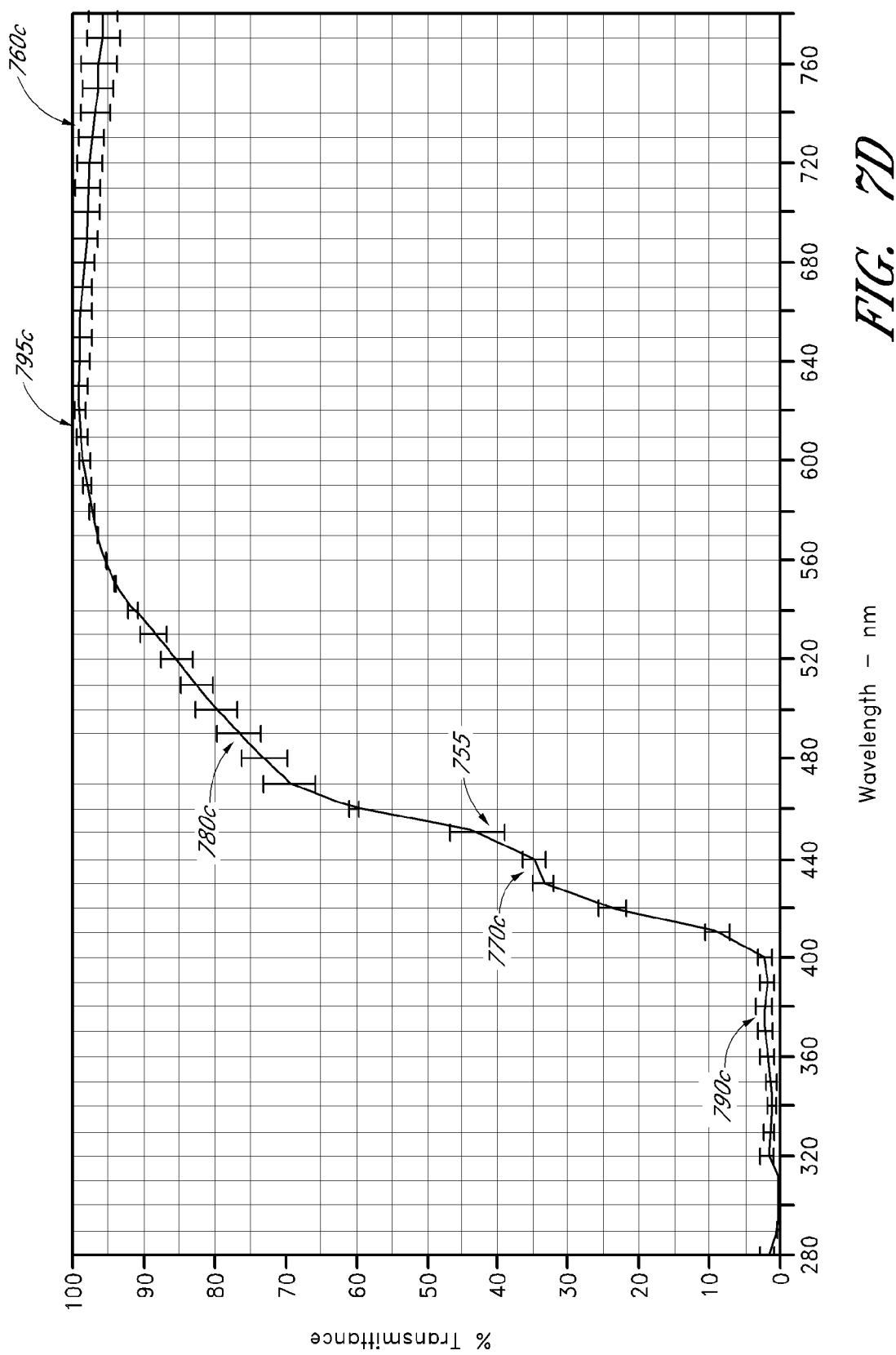
FIG. 7D is a plot of FIG. 7C illustrating example error bars.

As illustrated in FIG. 7C, the transmission curve 760c can include a stop band portion 790c positioned below about 400 nm. For example, the stop band portion 790c can be positioned between about 280 nm to about 400 nm. In some embodiments, as illustrated in FIG. 7C, the stop band portion 790c can include a region between about 320 nm to about 400 nm that reduces the amount of transmitted light by at least about 95% on average. FIG. 7D illustrates the transmission curve 760c of FIG. 7C with a few error bars 755 at various locations on the plot 750c. Persons skilled in the art would understand that there is some range of transmission percentages that would yield an optical treatment that may be designed to achieve similar results. The magnitudes of the various error bars shown in FIG. 7D are illustrative only and are not intended to limit the actual ranges of transmission percentages at the various wavelengths. As examples, in some embodiments, the reduction of transmitted light can be about 96%, about 96.5%, about 97%, about 97.5%, about 98%, about 98.5%, about 99%, or about 100% at about 320 nm, and/or about 330 nm, and/or about 340 nm, and/or about 350 nm, and/or about 360 nm, and/or about 370 nm, and/or about 380 nm, and/or about 390 nm, and/or about 400 nm, and/or about wavelengths between these wavelengths.

The transmission curve 760c of FIG. 7C also includes an engineered plateau region 770c positioned between about 420 nm to about 450 nm. This plateau region 770c can extend over a width of at least about 5 nm, at least about 7 nm, at least about 10 nm, at least about 15 nm, or at least about 20 nm. For example, the plateau region 770c can extend for at least about 10 nm within the wavelengths of about 420 nm to about 450 nm. For example, the plateau region 770c can extend from at least about 420 nm to about 430 nm, at least about 425 nm to about 435 nm, at least about 430 nm to about 440 nm, at least about 435 nm to about 445 nm, or at least about 440 nm to about 450 nm. The plateau region 770c can transmit at least about 30% of light on average. In some embodiments, the plateau region 770c can transmit about 30% to about 38% of light, about 30.5% to about 37.5% of light, about 31% to about 37% of light, about 31.5% to about 36.5% of light, about 32% to about 36% of light, about 32.5% to about 35.5% of light, or about 33% to about 35% of light.

The transmission curve 760c of FIG. 7C further includes an engineered ramp region 780c positioned between about 460 nm to about 560 nm. The ramp region 780c has higher transmission than the plateau region 770c and can extend over a width of at least about 80 nm, at least about 70 nm, at least about 60 nm, at least about 50 nm, or at least about 40 nm. In some embodiments, the ramp region 780c extends at least from about 470 nm to about 550 nm, at least from about 480 nm to about 540 nm, at least from about 490 nm to about 530 nm, or at least from about 500 nm to about 520 nm. The ramp region 780c can include a portion that reduces the amount of transmitted light on average by about 25% to about 35%, by about 25.5% to about 34.5%, by about 26% to about 34%, by about 26.5% to about 33.5%, by about 27% to about 33%, by about 27.5% to about 32.5%, or by about 28% to about 32%, for example, at about 470 nm, and/or about 480 nm, and/or about wavelengths in between these wavelengths. In some embodiments, the slope of the ramp region 780c, for example, between about 480 nm to about 530 nm can be on average about 0.27 to about 0.35, or can be about 0.28 to about 0.34. In certain embodiments, in between the plateau region 770c and the engineered ramp region 780c is another ramp region, which can have a higher slope than the engineered ramp region 780c. For example, in some embodiments, the ramp region with the higher slope can have a slope of about 1.2 to about 2.2 between about 450 nm to about 460 nm.

As illustrated in FIG. 7C, a second engineered plateau region 795c is positioned between about 570 nm to about 680 nm in the transmission curve 760c. The second plateau region 795c reduces the amount of transmitted light by less than or equal to about 3% on average at about 640 nm, and/or at about 650 nm, and/or at about 660 nm, and/or wavelengths therebetween. In some embodiments, the second plateau region 795c reduces the amount of transmitted light by less than or equal to about 2.5% of light, or by less than or equal to about 2% of light, or by less than or equal to about 1% of light, or by less than or equal to about 0% of light at about 640 nm, and/or at about 650 nm, and/or at about 660 nm, and/or wavelengths therebetween.

Without subscribing to any particular scientific theory, some embodiments may possibly enhance contrast between various colors. For example, it is possible that the yellow tint of some embodiments can enhance some red and green colors in addition to yellow colors. Since most computer displays are based on an RGB (red, green, blue) color model, it is possible for certain embodiments to enhance these colors and thus create more contrast. Some embodiments may also possibly reduce the perceived harshness of a bright screen and/or bright fluorescent lights by reducing the brightness of the display. Since many computer software applications, e.g., Microscoft® Word or Microsoft® Outlook, are blue-based, the harshness of the computer screen may be reduced by attenuating blue light, which is harsh to the eye. In addition, in some embodiments of computer eyewear with a similar transmission curve as shown in FIG. 7C, the percent transmission is reduced at locations near the resonant frequencies of mercury in fluorescent lighting, e.g., near about 440 nm and near about 550 nm. Without subscribing to any particular scientific theory, it is possible that since a yellow tint of some embodiments does not enhance blue colors, a warm environment may be provided by the enhancement of green and red colors, which are warmer and more soothing to the eye.

Figure 7E:
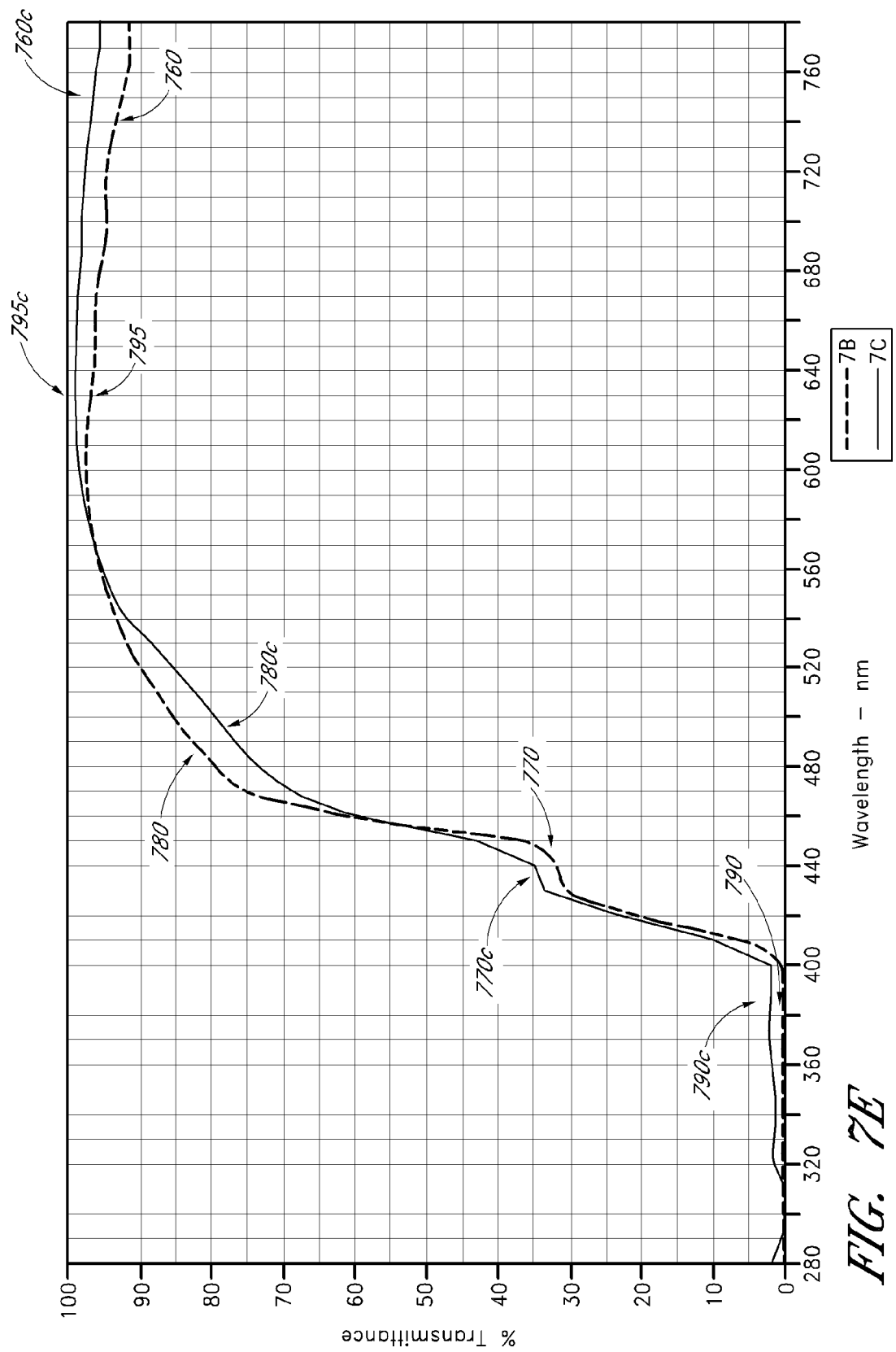
FIG. 7E illustrates example plots of FIG. 7B and FIG. 7C superimposed on one another.

In some embodiments, computer eyewear having a similar spectrum $760c$ of FIG. 7C provides a warmer and less grayish-blue environment to the user than computer eyewear having a transmission curve $760$ of FIG. 7B. FIG. 7E illustrates the example plots of FIG. 7B and FIG. 7C superimposed on one another. Without subscribing to any particular scientific theory, it is possible that in certain embodiments, a transmission curve similar to that of $760c$ of FIG. 7C provides a warmer and less grayish-blue spectrum because the transmission curve $760c$ of FIG. 7C more closely mimics the macular pigment light transmission with the eye. As discussed herein, sharp central vision, e.g., computer viewing, occurs in the fovea. The fovea is the center of the macula, which is covered by the macular pigment. The macular pigment is a yellow pigment that absorbs excess blue light to protect the eye from the damaging photo-oxidative effects of blue light It might be possible that a transmission curve, e.g., transmission curve $760c$, that more closely mimics the macular pigment light transmission with the eye, e.g., transmitting more light within the yellow to red wavelengths, e.g., about 570 nm to about 750 nm, provides a closer functionality to the macular pigment, which is protecting the fovea. Thus, it might be that certain embodiments, by providing less of a grayish-blue environment, and a brighter and cheerful environment during concentrated tasks like computer viewing, protect the fovea.

In some embodiments, the warmer and less grayish-blue spectrum $760c$ can result from a second plateau region $795c$ having a transmission of less than or equal to about 3%, less than or equal to about 2.5%, less than or equal to about 2%, less than or equal to about 1% of light, or less than or equal to about 0% of light at about 640 nm, and/or at about 650 nm, and/or at about 660 nm, and/or wavelengths therebetween. In some embodiments, the warmer spectrum $760c$ can result from a transmission curve that includes a portion that reduces the amount of transmitted light by about 25% to about 35%, by about 25.5% to about 34.5%, by about 26% to about 34%, by about 26.5% to about 33.5%, by about 27% to about 33%, by about 27.5% to about 32.5%, or by about 28% to about 32% at about 470 nm, and/or about 480 nm within the ramp region $780c$, and/or wavelengths therebetween. In some embodiments, it may be preferred to transmit a small percentage, e.g., about 1%, about 2%, or about 3%, of light at about 320 nm, and/or at about 330 nm, and/or about 340 nm, and/or about 350 nm, and/or about 360 nm, and/or about 370 nm, and/or about 380 nm, and/or about 390 nm, and/or about 400 nm, and/or wavelengths therebetween.

Persons skilled in the art may recognize ways to manipulate the transmission curve $760c$ to produce a transmission curve with similar results, e.g., more comfort, warmer, and less grayish-blue environment. For example, two, three, or four wavelengths other than those discussed herein can be used to characterize the transmission spectrum. In addition, transmission values other than those shown on the transmission curve $760c$ in FIG. 7C and/or discussed herein can be used. For example the transmission values, e.g., those on the transmission curve $760c$ in FIG. 7C, can vary by about +/−1%, about +/−1.5%, about +/−2%, about +/−2.5%, about +/−3%, about +/−3.5%, +/−4%, about +/−4.5%, about +/−5%, about +/−5.5%, about +/−6%, about +/−6.5%, +/−7%, about +/−7.5%, about +/−8%, about +/−8.5%, about +/−9%, about +/−9.5%, or about +/−10%. In addition, it is possible to scale the various percent transmissions by a substantially similar factor at certain wavelengths such that certain ratios remain substantially the same. For example, in some embodiments, the ratio of the percent transmission at about 470 nm to the percent transmission at about 440 nm can be about 1.8 to about 2.2. In some embodiments, the ratio of the percent transmission at about 470 nm to the percent transmission at about 440 nm can be about 1.9 to about 2.1. As another example, in some embodiments, the ratio of the percent transmission at about 650 nm to the percent transmission at about 470 nm can be about 1.3 to about 1.5. In some embodiments, the ratio of the percent transmission at about 650 nm to the percent transmission at about 470 nm can be about 1.35 to about 1.45. In yet another example, in some embodiments, the ratio of the percent transmission at about 650 nm to the percent transmission at about 440 nm can be about 2.7 to about 2.9. Additionally, it is possible to characterize the transmission spectrum with other ratios at these and other wavelengths.

Various methods can be used to fabricate lenses (or lens portions) characterized by a target transmission curve, e.g., $760c$ in FIG. 7C. An example fabrication process can include incorporating a colorant, e.g., a dye in liquid, powder, or pellet form, into the materials for the lenses or into the lenses themselves. For example, the lens polymer (Grilamid XE-3805) may be dried in a drying machine (under 80° temperature for 4-6 hours), and heated and mixed with a dye combination in a blender until the mixture is homogeneous. The mixture may then be placed in an injection machine and injected into a lens mold to provide lens blanks.

Any dye combination may be used that has the desired spectral profile. In some embodiments, a dye combination may comprise a yellow dye, a first orange dye, a second orange dye, and Diffusant EBFF. A dye combination may be any combination of dyes that is blended or mixed with a lens material to form a lens comprising the dyes of the dye combination. In some embodiments, some or all of the dyes may be premixed before combining with the lens material. A lens material may be any material suitable as a lens for eyewear such as glasses or sunglasses. For example, transparent polymers, inorganic glasses, and the like may be suitable lens material.

The yellow dye may be any compound having a suitable yellow color, such as Yellow CY03 (Union Chemical, Taiwan), and may be present in an amount in the range of about 15% to about 26%, about 18% to about 22%, or about 20%, by weight based upon the total weight of the dye combination. The first orange dye may be any compound having a suitable orange color, such as Orange 8150 (Union Chemical, Taiwan), and may be present in an amount in the range of about 4% to about 11%, about 6% to about 8%, or about 7%, by weight based upon the total weight of the dye combination. The second orange dye may be any compound having a suitable orange color, such as Orange Type 台 - (Union Chemical, Taiwan), and may be present in an amount in the range of about 0.7% to about 3.4%, about 0.1% to about 0.2%, or about 0.18%, by weight based upon the total weight of the dye combination.

Diffusant EBFF (Union Chemical, Taiwan) may be present in an amount in the range of about 60% to about 80%, about 69% to about 75%, or about 71%, by weight based upon the total weight of the dye combination. In some embodiments, the dye combination may comprise about 20% Yellow CY03, about 7% Orange 8150, about 2% Orange type 台 -, and about 71% Diffusant EBFF, by weight, based upon the total weight of the dye combination. In some embodiments, the dye combination may comprise about 19.6% Yellow CY03, about 7.1% Orange 8150, about 1.8% Orange type 台 -, and about 71.4% Diffusant EBFF by weight, based upon the total weight of the dye combination. Other methods to incorporate the colorant into the lenses are possible, e.g., the lenses could be immersed into a dye bath.

Certain embodiments of computer eyewear can incorporate other optical treatments and/or features described elsewhere in this disclosure. For example, various embodiments can also include a hard coating, a mirror coating, an anti-reflective (AR) coating or a flash mirror, combinations of the same, or the like on one or more of the base and ocular lens surfaces to reduce haze, glare, and scratches. In some embodiments, the coatings can be fabricated by one or more metal and/or dielectric layers formed by vacuum deposition, physical vapor deposition, lamination of a sheet of reflective material on a lens surface, for example, with an adhesive, or any other thin film coating technology. Persons skilled in the art would understand that when choosing materials for the colorant and/or lenses or when manufacturing the lenses, any coatings to be used in the final computer eyewear product are preferably accounted for in order to provide the targeted transmission curve, e.g., FIG. 7C. In some embodiments, using a blue coating, e.g., a blue flash mirror that reflects blue more than other colors, can reduce the amount of yellow color because, without subscribing to any particularly scientific theory, it is possible that blue may counteract and subdue yellow. Thus, transmission curve 760c provides an example transmission curve for a lens whose yellow tint takes into consideration the effects on color and light transmission of the blue flash mirror.

Various embodiments of computer eyewear also can incorporate other additional features, e.g., frames and removable side-shields, as described herein. For example, various embodiments also include a frame portion disposed about a first and second lens (or a first and second lens portion) to provide support. In some embodiments, the wrap angle can be within about 11 degrees to about 27 degrees range. For example, in some embodiments, the wrap angle can be between about 12 degrees to about 15 degrees with about a +/−1 degree tolerance. In other embodiments, the wrap angle can be between about 18 degrees to about 26 degrees with about a +/−1 degree tolerance. Persons skilled in the art would understand that when choosing materials for the colorant and/or lenses or when manufacturing the lenses, any frames to be used in the final computer eyewear product are preferably accounted for in order to provide the targeted transmission curve, e.g., FIG. 7C. For example, lenses in frames can trap light, thus changing the viewed color. Rimless frames, in some embodiments, can trap more light than rimmed frames.

Various embodiments of computer eyewear can include a first and second lens or a first and second lens portion, each lens or lens portion having optical power in the range from about +0.1 to about +0.5 diopters, about +0.1 to about +0.45 diopters, about +0.1 to about +0.4 diopters, about +0.1 to about +0.35 diopters, about +0.1 to about +0.3 diopters, about +0.1 to about +0.25 diopters, or about +0.1 to about +2 diopters, or any other diopter power specified herein. Each lens can have optical power less than about +0.5 diopters, less than about +0.25 diopters, or equal to about +0.2 diopters. Each lens or lens portion can have substantially the same optical power or can have a different optical power. Each lens or lens portion can provide spectral filtering characterized by a transmission curve described herein.

In certain embodiments of computer eyewear, the first and second lens (or the first and second lens portion) have substantially the same optical power to provide off-the-shelf correction for a user having substantially normal uncorrected or spectacle vision when viewing a computer screen. Certain embodiments include a kit comprising a package of three or more pairs of the off-the-shelf computer eyewear. The kits can include three or more pairs of off-the-shelf computer eyewear with each pair having substantially the same optical power as the other pairs of computer eyewear within the kit. The kits can also include three or more pairs of off-the-shelf computer eyewear with at least two pairs having different optical power from each other, e.g., for different family members. The non-prescription computer eyewear described herein can be mass produced by known processes, e.g., injection molding as described herein, or processes yet to be developed.

Certain embodiments can also provide for prescription computer eyewear. For example, the first and second lens can have an additional amount of optical power to provide prescriptive correction for a user when viewing a computer screen. Each lens can provide spectral filtering characterized by a similar transmission curve as provided in FIG. 7C. Such non-prescription computer eyewear can be produced by known processes, e.g., immersion into a dye bath, or processes yet to be developed. Various embodiments of computer eyewear, non-prescription or prescription, can also include any other features described herein, e.g., base curvature, wrap, and/or pantoscopic tilt.

In some embodiments, the computer eyewear 110 includes optical treatments to provide spatial filtering of light that is incident upon the lenses 120. Spatial filtering of light incident upon the lenses 110 can be used to preferentially attenuate the transmission of, or otherwise alter, light originating from a selected direction within a user's field of view. This can be done, for example, by applying optical treatments to the lenses 120 that cause the optical characteristics of the lenses 120 to spatially vary across one or more lens surfaces. In some embodiments, optical treatments that provide spatial filtering of light can have broadband spectral characteristics such that they affect all visible wavelengths of light substantially equally (e.g., neutral density spatial filtering). In other embodiments, optical treatments for spatial filtering can be combined with separate optical treatments for performing spectral filtering of incident light, as described herein. In still other embodiments, a single optical treatment, such as a partially transmissive mirror coating or tint, can be designed to perform both spectral and spatial filtering.

Figure 8:
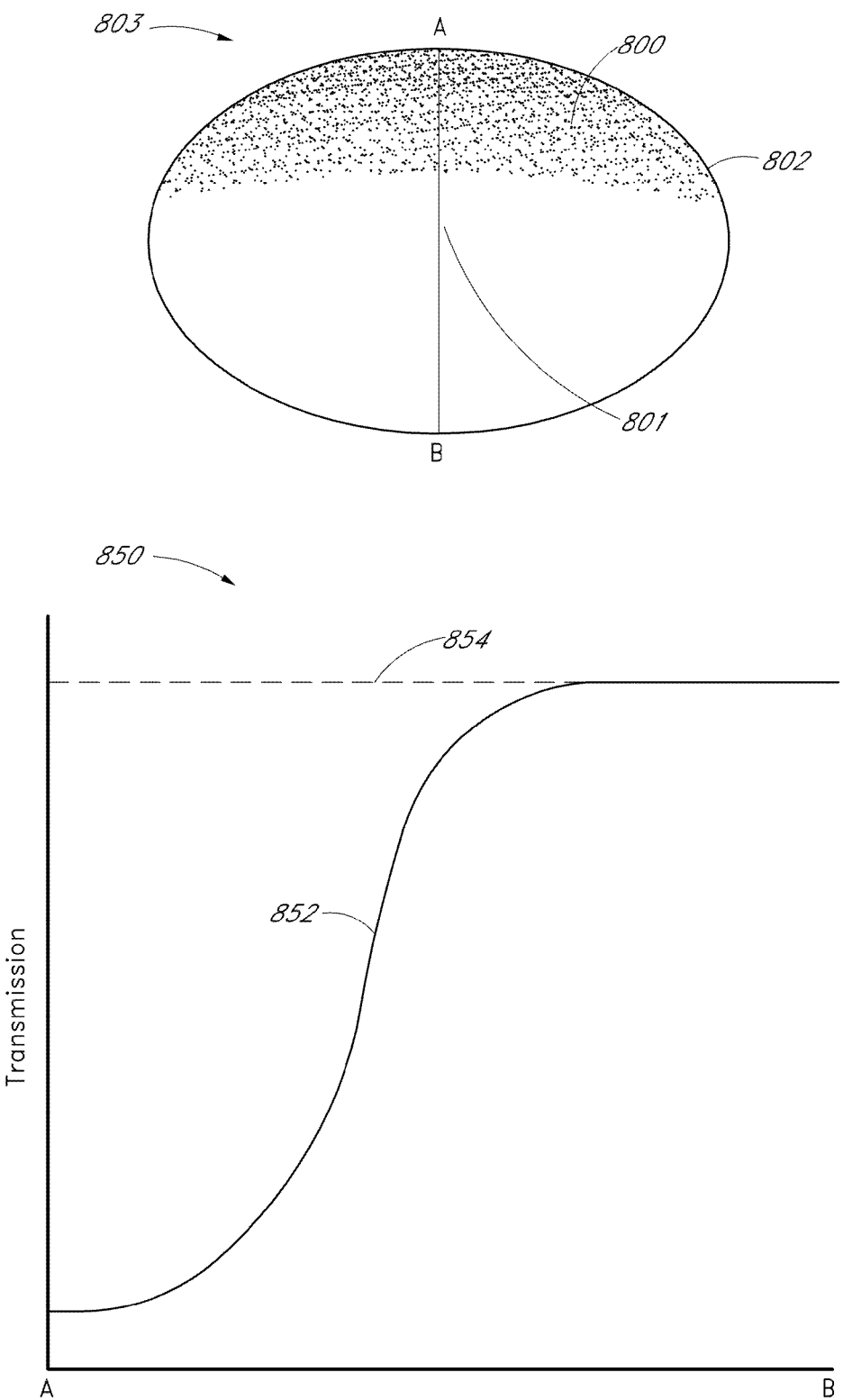
FIG. 8 illustrates one embodiment of a non-uniform optical treatment for performing spatial filtering of light incident upon a lens.

FIG. 8 illustrates one embodiment of a non-uniform optical treatment 800 (illustrated as shading) for performing spatial filtering of light incident upon a lens 803. The optical treatment 800 can be a partially transmissive mirror coating, tinting, a combination of the two, or the like. The lens 803 includes a center region 801, which in some embodiments encompasses the mechanical center, or centroid, of the lens 803. The lens 803 also includes periphery regions near the edge 802 of the lens 803. The periphery regions include an upper region, which can encompass, for example, any portion of the lens 803 nearer point A than point B. The periphery regions can also include a lower region, which can encompass, for example, any portion of the lens 803 nearer point B than point A. For other lens shapes, the center, periphery, upper, and lower regions may be defined differently.

Point A is located in the vicinity of the upper region of the lens 803, while point B is located in the vicinity of the lower region of the lens 803. The curve 852 of the graph 850 shows the transmission of light through the lens 803 as a function of the position along the line AB that is indicated on the lens 803. The dotted line 854 indicates the level of transmission of light through the lens in the absence of the optical treatment 800 whose characteristics are illustrated by the curve 852. For example, if the optical treatment 800 is a mirror coating, the dotted line 854 represents the amount of incident light that is transmitted through the lens 803 in the absence of the mirror coating, since not all incident light will be transmitted by the lens 803 even in regions with no mirror coating due to some amount of Fresnel reflection at the air-lens interface.

In this embodiment, the optical treatment 800 is configured such that the transmissivity of the lens 803 increases smoothly from point A to point B. Thus, the curve 852 illustrates one embodiment where the transmissivity of the lens 803 is lesser in the vicinity of the upper region than in the vicinity of the middle and lower regions. In some embodiments, the transmissivity of the lens 803 in the lower region is at least about 15% less than in the upper region, and could be as much as approximately 70% less. While a transmission curve 852 is only indicated along the line AB, it should be understood that similar curves could be drawn for other lines between upper and lower regions of the lens 803 to indicate a generally lower transmissivity in the upper regions of the lens than in the lower regions, as roughly illustrated by the shading on the lens 803. Furthermore, in other embodiments, the transmission curve 852 can increase from A to B according to any other smooth path, including a linear path. The transmission curve 852 can be monotonic, but this is not required. Smooth transitions may be desirable in certain embodiments to avoid harsh transitions in the optical characteristics of the lens 803 between different regions in a user's field of view. However, discontinuous jumps in the transmission curve 852 are also possible and desirable in some situations. In fact, the transmission curve 852 may include more than one discontinuous jump such as, for example, a step transition from one level of transmissivity to another.

In the case where the optical treatment 800 is a partially transmissive mirror coating, the decreased transmissivity of the lens in the upper region is due principally to the fact that the reflectivity of the mirror coating is greater in the upper region of the lens 803. Increased reflectivity of the partially transmissive mirror coating near the upper region can be accomplished, for example, by making the partially transmissive mirror coating thicker in the upper region of the lens 803. In the case where the optical treatment 800 is a tinting material, decreased transmissivity of the lens 803 in the upper region near point A is due principally to increased absorptivity of the tinting material in the upper region of the lens 803. In either case, however, the dotted line 854 indicates the level of transmissivity of the lens 803 in the absence of the optical treatment 800. Thus, since the transmission curve 752 reaches up to the dotted line 754, at least a portion of the lens 803 is not affected by the optical treatment 800 in this embodiment.

Embodiments like the one illustrated in FIG. 8 where the transmissivity of the lens 803 in the upper region is lesser than the transmissivity of the lens in the middle and lower regions can be useful in preferentially attenuating the transmission of light that originates in a user's upper field of view. For example, when a user is seated at a computer terminal, the optical treatment 800 which provides for decreased transmissivity in the upper region of the lens 803, preferentially attenuates overhead lighting. This can reduce glare from the overhead lighting and make for more comfortable viewing of a computer terminal, reducing various symptoms of CVS. In addition, the optical treatment 800 can be configured to attenuate spectral peaks in the spectrum of the overhead lighting, as described herein.

Figure 9:
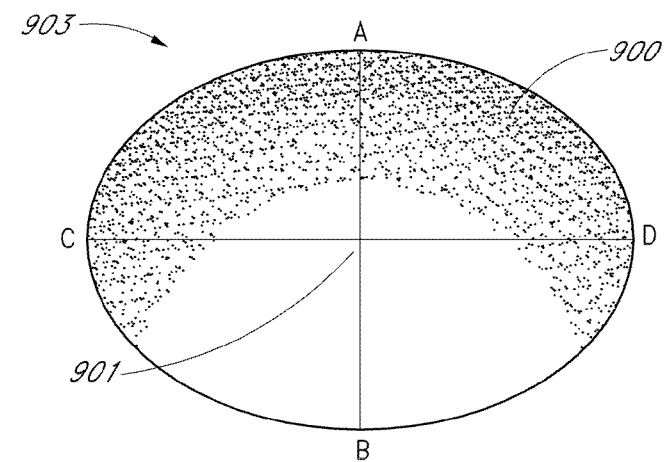
FIG. 9 illustrates another embodiment of a non-uniform optical treatment for performing spatial filtering of light incident upon a lens.
Figure 9:
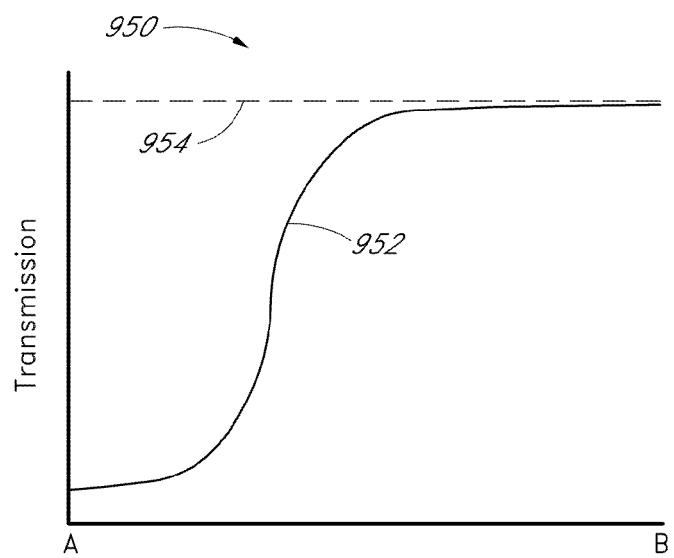
Figure 9:
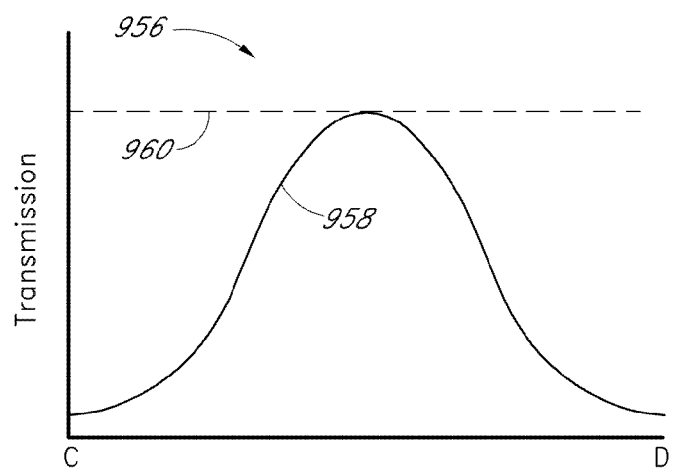

FIG. 9 illustrates another embodiment of a non-uniform optical treatment 900 (illustrated by the shading on lens 903) for performing spatial filtering of light incident upon a lens 903. The optical treatment 900 can be a partially transmissive mirror coating, tinting, a combination of the two, or the like. As described with reference to the lens 803 of FIG. 8, the lens 903 includes a center region 901 as well as periphery regions. The periphery regions include an upper region, and a lower region. The periphery regions also include first and second side regions, which can encompass, for example, any portion of the lens 903 nearer point C than point D for the first region, or nearer point D than point C for the second region.

Point A is located in the vicinity of the upper region of the lens 903, while point B is located in the vicinity of the lower region of the lens 903. The curve 952 of the graph 950 shows the transmission of light through the lens 903 as a function of position along the line AB that is indicated on the lens 903. The dotted line 954 indicates the level of transmission of light through the lens in the absence of the optical treatment whose characteristics are illustrated by the curve 952. Similarly to the embodiment illustrated in FIG. 8, the optical treatment is configured such that the transmissivity of the lens 903 increases smoothly from point A to point B.

Point C is located in the vicinity of the first side region of the lens 903, while point D is located in the vicinity of the second side region of the lens 903. Similarly to curve 952, curve 958 of the graph 956 shows optical transmission versus position on the lens. However, curve 958 shows the transmissivity profile of the lens along line CD. Again, the dotted line 960 indicates the level of transmission of light through the lens in the absence of the optical treatment 900 whose characteristics are illustrated by the curve 958. The optical treatment 900 is configured such that the transmissivity of the lens 903 varies smoothly from point C to point D and is lesser in the vicinity of the first and second side portions than in the vicinity of the middle region.

While only two transmission curves 952 and 958 are indicated for the lens 903, it should be understood that similar curves could be drawn for other lines on the lens 903 to indicate a generally lower transmissivity in the upper and side regions of the lens than in the middle and lower-middle regions, as roughly illustrated by the shading on lens 903. In some embodiments, the transmissivity of the lens 903 varies smoothly, whether monotonically or not, from the upper and side regions to the middle and lower-middle regions. In other embodiments, the transmissivity can discontinuously jump between one or more levels of transmissivity.

Embodiments where the transmissivity of the lens 903 in the upper and side regions is lesser than the transmissivity of the lens 903 in the middle and lower-middle regions can be useful in preferentially attenuating the transmission of light that originates in the upper and side portions of a user's field of view. For users working at a computer, this type of spatial filtering selectively attenuates light from most sources other than a computer screen located in the middle region of a user's field of view, as well as a desk area located in a lower region of the user's field of vision. This type of embodiment reduces glare, not only from overhead lighting, but also from other sources of light, including reflections, in other portions of the user's periphery field of view.

Figure 10:
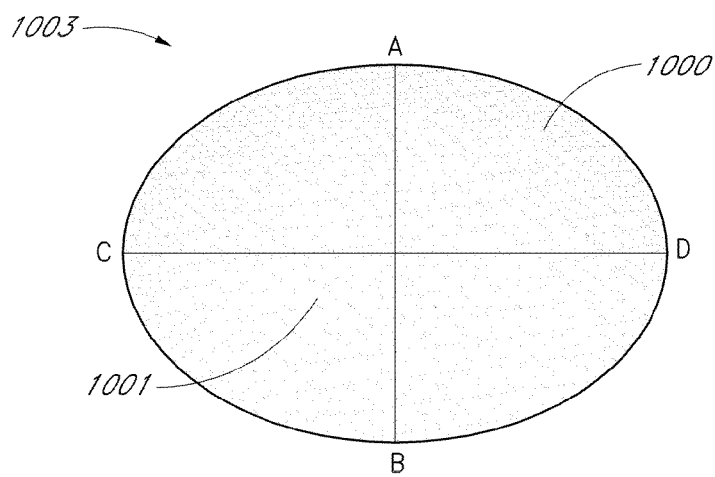
FIG. 10 illustrates one embodiment of an optical treatment for performing spatial filtering of light incident upon a lens.
Figure 10:
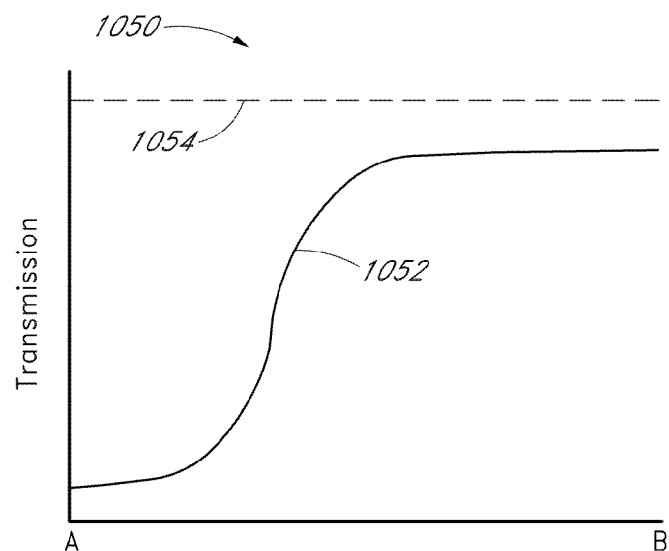
Figure 10:
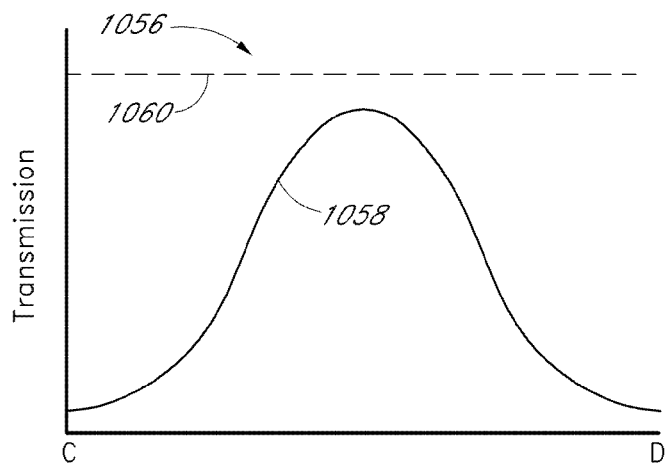

FIG. 10 illustrates another embodiment of an optical treatment 1000 for performing spatial filtering of light incident upon a lens 1003. Similarly to the embodiment illustrated in FIG. 9, the lens 1003 includes an optical treatment 1000 that causes the upper and side regions of the lens 1003 to have a lesser transmissivity than the middle and lower-middle portions. The optical treatment 1000 can be a partially transmissive mirror coating, tint, a combination of the two, or the like. A distinctive feature of the optical treatment 1000 in this embodiment is that it establishes a baseline level of reduced transmission of light over substantially the entire lens 1003 surface. The level of transmission of light through the lens 1003 then decreases from the baseline level in some regions of the lens 1003.

The baseline level of reduced transmission of light through the lens 1003 is illustrated by the gap between the dotted line 1054 and the transmission curve 1052 in graph 1050, as well as between the dotted line 1060 and the transmission curve 1058 in graph 1056. As before, the dotted lines 1054 and 1060 indicate the level of transmission of light through the lens 1003 in the absence of the optical treatment 1000 whose characteristics are illustrated by the transmission curves 1052 and 1058. The gaps show that the optical treatment 1000 applied to the lens 1003 at least partially attenuates the transmission of light over substantially the entire lens surface and provides a baseline level of attenuation of transmitted light.

For example, a partially transmissive mirror coating can be applied to substantially the entire lens 1003. The mirror coating can be configured to provide a minimum level of reflectivity in the regions of the lens 1003 where the transmission of light through the lens 1003 is greatest. For the embodiment of FIG. 10, the regions of greatest transmissivity are the middle and lower-middle regions of the lens. The reflectivity of the mirror coating then increases toward the upper and side regions of the lens 1003 where the transmissivity is less. Thus, the mirror coating provides a baseline level of reflectivity over the lens 1003, with increased reflectivity in certain regions, rather than providing a mirror coating over a portion of the lens 1003 only. In another embodiment, a similar effect is achieved by treating the lens 1003 with a tint. The tint can be applied over substantially the entire lens 1003 to provide a non-zero baseline level of absorptivity, with increased absorptivity in certain regions of the lens 1003. For example, the tint can be configured to provide increased absorptivity in the upper and side regions of the lens 1003 to attenuate the transmission of light through the lens 1003 in those areas.

In some embodiments, the baseline amount of attenuation in the transmissivity of the lens 1003 is provided by a first optical treatment, while increased attenuation in certain regions of the lens 1003 is provided by a second optical treatment. Each optical treatment can be substantially neutral density, or can spectrally filter incident light as described above. For example, a uniform tint can be applied to the lens 1003 to provide a baseline amount of decreased transmissivity of the lens. A non-uniform partially transmissive mirror coating can then be applied to decrease the transmissivity of the lens in certain regions more than in others.

In one embodiment, the tint acts as a spectral filter that tends to balance the spectrum of fluorescent or incandescent lighting in an office environment, as described herein. The tint can be substantially uniform so as to establish a baseline decrease in the transmission of light through the lens 1003 over substantially its entire surface. A mirror coating can then be used to provide spatial filtering of incident light to reduce glare from, for example, overhead lighting. In another embodiment, the roles of the tint and the mirror coating are reversed such that the mirror coating is applied to the lens 1003 to provide a baseline reduction in the transmissivity of the lens 1003, while the tint is applied to provide spatial filtering of incident light. Other designs are also possible.

It should be understood that, while FIG. 10 illustrates embodiments where a baseline reduction in the transmissivity of the lens 1003 is provided along with increased reductions to the transmissivity of the lens in the upper and side regions, in other embodiments other regions of the lens 1003 can have increased attenuation beyond the baseline level. Furthermore, the attenuation of the transmissivity of the lens 1003 can vary smoothly (whether monotonically or not), as roughly illustrated by the shading on lens 1003, or discontinuously.

In addition to providing optical treatments to selectively attenuate the transmission of light through various regions of a lens, some embodiments include optical treatments for selectively altering the amount of light that is reflected from a surface of a lens. For example, an optical treatment can be provided that selectively reduces the amount of light that originates generally from beside and behind a user that is reflected from the ocular curve of a lens into the eyes. One such embodiment is illustrated in FIG. 11.

Figure 11:
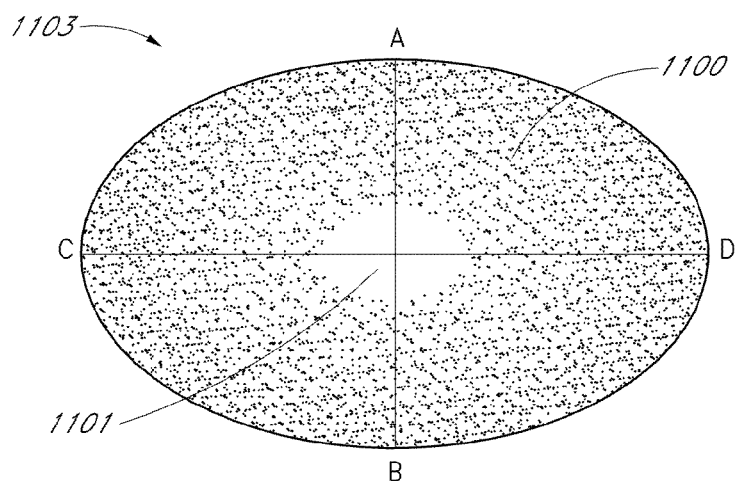
FIG. 11 illustrates one embodiment of an optical treatment for performing spatial filtering of light incident upon a lens.
Figure 11:
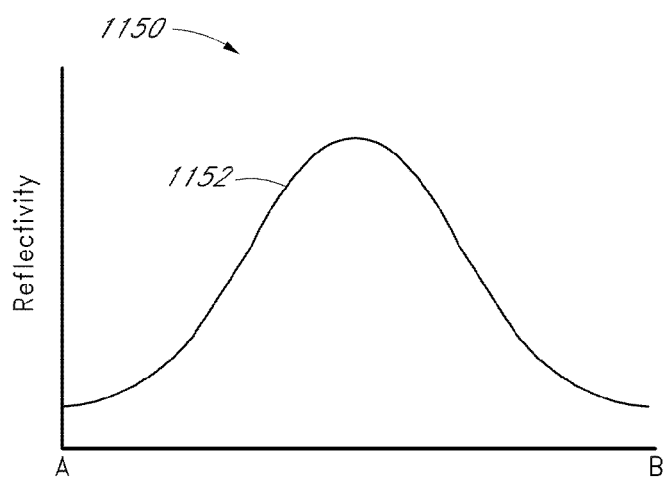
Figure 11:
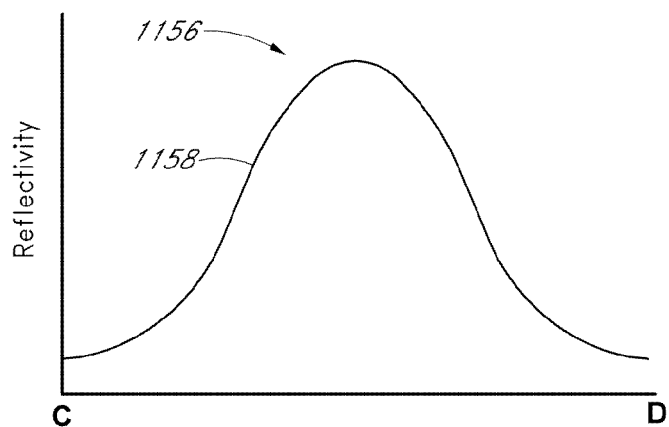

FIG. 11 illustrates another embodiment of an optical treatment 1100 for performing spatial filtering of light incident upon a lens 1103. In this embodiment, the optical treatment 1100 is an AR coating applied to the ocular curve, or eye-side surface, of the lens 1103, though in some embodiments it is a partially transmissive mirror coating or tint applied to either the base or ocular curve. As in FIGS. 8-10, the lens 1103 includes a center region 1101 and peripheral regions. The peripheral regions include an upper region, a lower region, and first and second side regions.

Point A is located in the vicinity of the upper region of the lens 1103, while point B is located in the vicinity of the lower region of the lens 1103. The curve 1152 of the graph 1150 shows reflection of light from the lens 1103 as a function of position along the line AB. Likewise, the curve 1158 of the graph 1156 shows reflection of light from the lens 1103 as a function of position along the line CD. In this embodiment, the AR coating is configured such that the reflectivity of the lens 1103 is lesser in the periphery regions than in the middle region. In fact, the reflectivity of the lens decreases smoothly from the middle region of the lens, represented on the graphs 1150 and 1156 as the portion between points A and B and between points C and D, though in other embodiments the reflectivity may vary discontinuously.

Thus, FIG. 11 illustrates an embodiment where the characteristics of the optical treatment vary according to a gradient extending radially from a center location. In particular, FIG. 11 illustrates an optical treatment with an annular gradient. Contour lines of the gradient illustrated in FIG. 11 will generally have closed paths. In some embodiments, the contour lines of the gradient are substantially circular, though they could be elliptical or have any other closed path. In some embodiments, an optical treatment with this type of gradient is formed on a lens by patterning the gradient on a thin film and then laminating the thin film onto a surface of the lens. This thin film can be, for example, a tinting layer, a mirror coating layer, or an AR coating layer.

The AR coating represented by FIG. 11 is effective at reducing glare from light that originates generally from behind a user and is incident upon the ocular curve of the lens 1103. For example, in an office environment if a window is located behind the user, light from the window could reflect from the ocular side of the lens 1103 and into the user's eye, resulting in increased glare and associated symptoms of CVS.

However, since the AR coating represented in FIG. 11 is located on the ocular curve of the lens 1103, it is effective at decreasing glare from lighting that originates generally behind the user but that is not blocked by the user's head. The AR coating can be configured to decrease the reflectivity of the lens 1103 more substantially in the peripheral regions of the lens than in the middle region since light that reflects from the middle region of the ocular side of the lens 1103 is less likely to be re-directed into the user's eyes. In other embodiments, the AR coating may be substantially uniform over the surface of the ocular side of the lens 1103. In some embodiments, an AR coating can also be formed on the base side of the lens 1103.

Various embodiments of improved computer eyewear have been disclosed herein. In some embodiments, the embodiments of computer eyewear are off-the-shelf, non-prescription eyewear. Since the computer eyewear is non-prescription eyewear, it can be mass manufactured without knowledge of the optometric prescriptions of the end-users for which the eyewear is intended. Once manufactured, sets of the computer eyewear can be packaged together for shipping to retailers. A package can include multiple sets of the eyewear with identical optical power, or sets of computer eyewear with several different amounts of optical power. For example, the package could include three or more pairs of eyewear, though the number can vary. In some embodiments, the package includes at least five pairs of eyewear, while in others the package includes at least ten pairs of eyewear. The computer eyewear can also be packaged as part of a kit that also includes instructions for proper usage of the eyewear. For example, the instructions can direct the user to view a computer screen with the eyewear at a given viewing distance. For example, in some embodiments, the eyewear is intended for viewing a computer display at a distance of 30 inches or less. The kit can also include removable side-shields for use with the eyewear.

While certain embodiments of computer eyewear have been explicitly described herein, other embodiments will become apparent to those of ordinary skill in the art based on this disclosure. Therefore, the scope of the inventions is intended to be defined by reference to the claims and not simply with regard to the explicitly described embodiments. Furthermore, while some embodiments have been described in connection with the accompanying drawings, a wide variety of variation is possible. For example, components, and/or elements may be added, removed, or rearranged.

APPENDIX A

Summary of Experimental Test Results

Power Preference Statistics:

| Total Pool |
| --- |
| 34.85% preferred + .125 power |
| 30.30% preferred + .250 power |
| 16.67% preferred + .375 power |
| 9.10% preferred + .500 power |
| 12.12% preferred planar |
| Age group 20-24 |
| 38.10% preferred + .125 power |
| 47.62% preferred + .250 power |
| 0.00% preferred + .375 power |
| 0.00% preferred + .500 power |
| 9.52% preferred planar |
| Age Group 25-39 |
| 23.33% preferred + .125 power |
| 26.67% preferred + .250 power |
| 23.33% preferred + .375 power |
| 13.33% preferred + .500 power |
| 16.67% preferred planar |
| Age Group 40+ |
| 46.67% preferred + .125 power |
| 20.00% preferred + .250 power |
| 26.67% preferred + .375 power |
| 13.33% preferred + .500 power |
| 6.67% preferred planar |

While wearing their preferred computer eyewear, participants (58) felt:

| | |
| --- | --- |
| Eyes more moisturized | 6.90% |
| Eyes more energized | 22.41% |
| Eyes more relaxed | 62.07% |
| Computer screen clearer and text sharper | 51.72% |

What is claimed is:

1. Computer eyewear comprising:
    first and second lenses, each having optical power in the range from about +0.1 to about +0.5 diopters, each lens providing spectral filtering characterized by a transmission curve, the transmission curve including:
        a stop band portion positioned between about 320 nm to about 400 nm, the stop band portion reducing transmitted light by at least about 95% on average;
        a first plateau region positioned between about 420 nm to about 450 nm, the first plateau region transmitting at least about 30% of light on average;
        a ramp region positioned between about 470 nm to about 560 nm, the ramp region having higher transmission than the first plateau region and reducing transmitted light by about 25% to about 35% on average at about 470 nm to about 480 nm; and
        a second plateau region positioned between about 570 nm to about 680 nm, the second plateau region reducing transmitted light by less than or equal to about 3% on average at about 640 nm to about 660 nm; and
    a frame portion disposed about the first and second lenses to provide support.

2. The computer eyewear of claim 1, wherein each lens comprises a yellow tint to contribute to the spectral filtering.

3. The computer eyewear of claim 1, wherein the stop band portion reduces the transmitted light by at least about 97%.

4. The computer eyewear of claim 1, wherein the stop band portion transmits at least about 1% of light between about 320 nm to about 400 nm.

5. The computer eyewear of claim 1, wherein the first plateau region extends over a width of at least about 10 nm.

6. The computer eyewear of claim 1, wherein the first plateau region extends between about 430 nm to about 440 nm.

7. The computer eyewear of claim 1, wherein the first plateau region transmits about 32% to about 36% of light.

8. The computer eyewear of claim 1, wherein the first plateau region transmits about 32.5% to about 35.5% of light.

9. The computer eyewear of claim 1, wherein the ramp region extends over a width of at least about 50 nm.

10. The computer eyewear of claim 1, wherein the ramp region extends between about 480 nm and about 530 nm.

11. The computer eyewear of claim 1, wherein the ramp region reduces transmitted light by about 25.5% to about 34.5% at about 470 nm to about 480 nm.

12. The computer eyewear of claim 1, wherein the ramp region reduces transmitted light by about 26% to about 34% at about 470 nm to about 480 nm.

13. The computer eyewear of claim 1, wherein the ramp region reduces transmitted light by about 26.5% to about 33.5% at about 470 nm to about 480 nm.

14. The computer eyewear of claim 1, wherein the second plateau region reduces transmitted light by less than or equal to about 2.5% of light at about 640 nm to about 660 nm.

15. The computer eyewear of claim 1, wherein the second plateau region reduces transmitted light by less than or equal to about 2% of light at about 640 nm to about 660 nm.

16. The computer eyewear of claim 1, wherein the first and second lenses have substantially the same optical power to provide off-the-shelf correction for a user having substantially normal uncorrected or spectacle vision when viewing a computer screen.

17. A kit comprising a package of three or more pairs of the computer eyewear of claim 1.

18. The computer eyewear of claim 1, wherein the first and second lenses have an additional amount of optical power to provide prescriptive correction for a user when viewing a computer screen, each lens providing spectral filtering characterized by the transmission curve.

19. The computer eyewear of claim 1, wherein each lens has optical power less than about +0.5 diopters.

20. The computer eyewear of claim 1, wherein each lens has optical power less than about +0.25 diopters.

21. The computer eyewear of claim 1, wherein each lens has optical power equal to about +0.2 diopters.

22. The computer eyewear of claim 1, wherein the computer eyewear has wrap or pantoscopic tilt.

23. The computer eyewear of claim 1, wherein the first and second lenses each comprises a dye combination comprising about 20% Yellow CY03, about 7% Orange 8150, about 2% Orange type 台-, and about 71% Diffusant EBFF by weight, based upon the total weight of the dye combination.

24. Computer eyewear comprising:
first and second lenses, each having optical power in the range from about +0.1 to about +0.5 diopters, each lens providing spectral filtering characterized by a transmission curve, the transmission curve including:
a stop band portion positioned between about 320 nm to about 400 nm;
a first plateau region positioned between about 420 nm to about 450 nm;
a ramp region positioned between about 470 nm to about 560 nm, the ramp region having higher transmission than the first plateau region; and
a second plateau region positioned between about 570 nm to about 680 nm, wherein a ratio of a percent transmission at about 470 nm to a percent transmission at about 440 nm is about 1.8 to about 2.2; and
a frame portion disposed about the first and second lenses to provide support.

25. The computer eyewear of claim 24, wherein the ratio is about 1.9 to about 2.1.

26. The computer eyewear of claim 24, wherein a ratio of a percent transmission at about 650 nm to a percent transmission at about 470 nm is about 1.3 to about 1.5.

27. The computer eyewear of claim 26, wherein the ratio of the percent transmission at about 650 nm to the percent transmission at about 470 nm is about 1.35 to about 1.45.

28. The computer eyewear of claim 24, wherein a ratio of a percent transmission at about 650 nm to a percent transmission at about 440 nm is about 2.7 to about 2.9.

29. The computer eyewear of claim 24, wherein the first and second lenses each comprises a dye combination comprising about 20% Yellow CY03, about 7% Orange 8150, about 2% Orange type 台-, and about 71% Diffusant EBFF by weight, based upon the total weight of the dye combination.

* * * * *